United States Patent
Ruggieri et al.

(10) Patent No.: US 7,019,412 B2
(45) Date of Patent: Mar. 28, 2006

(54) POWER GENERATION METHODS AND SYSTEMS

(75) Inventors: Frank Ruggieri, Merritt Island, FL (US); Dave Lackstrom, Cape Canaveral, FL (US); Napoleon P. Salvail, Titusville, FL (US); Rudolph N. J. Draaisma, A. Muang Suphanburi (TH)

(73) Assignee: Research Sciences, L.L.C., Rockledge, FL (US)

( * ) Notice: Subject to any disclaimer, the term of this patent is extended or adjusted under 35 U.S.C. 154(b) by 0 days.

(21) Appl. No.: 10/826,652

(22) Filed: Apr. 16, 2004

(65) Prior Publication Data

US 2004/0216460 A1    Nov. 4, 2004

Related U.S. Application Data

(63) Continuation-in-part of application No. 10/414,672, filed on Apr. 16, 2003, now abandoned.

(60) Provisional application No. 60/544,466, filed on Feb. 13, 2004, provisional application No. 60/372,869, filed on Apr. 16, 2002.

(51) Int. Cl.
    *F01K 25/00*    (2006.01)
(52) U.S. Cl. ............................. 290/2; 60/673
(58) Field of Classification Search ............... 290/2; 60/649, 670, 671, 673
    See application file for complete search history.

(56) References Cited

U.S. PATENT DOCUMENTS

| | | | |
|---|---|---|---|
| 340,718 A * | 4/1886 | Honigmann | 122/21 |
| 3,505,810 A * | 4/1970 | Gohee | 60/673 |
| 3,567,952 A | 3/1971 | Doland | 290/1 |
| 3,724,212 A | 4/1973 | Bell | 60/73 |
| 3,774,397 A * | 11/1973 | Engdahl | 60/667 |
| 3,830,063 A | 8/1974 | Morgan | 60/645 |
| 3,974,644 A | 8/1976 | Martz | 60/39.18 B |
| 4,031,404 A | 6/1977 | Martz | 290/40 R |
| 4,288,989 A * | 9/1981 | Cassidy | 60/685 |
| 4,307,572 A * | 12/1981 | Brinkerhoff | 60/649 |
| 4,479,354 A | 10/1984 | Cosby | 60/670 |
| 4,503,682 A * | 3/1985 | Rosenblatt | 60/671 |
| 4,573,321 A * | 3/1986 | Knaebel | 60/649 |
| 4,738,111 A * | 4/1988 | Edwards | 60/671 |
| 4,920,276 A | 4/1990 | Tateishi | 290/2 |
| 5,466,134 A | 11/1995 | Shaffer | 418/15 |

(Continued)

FOREIGN PATENT DOCUMENTS

| GB | 2114671 A * | 8/1983 |
|---|---|---|
| GB | 2294294 A * | 4/1996 |

*Primary Examiner*—Joseph Waks
(74) *Attorney, Agent, or Firm*—Brian S. Steinberger; Law Offices of Brian S. Steinberger, P.A.

(57) ABSTRACT

A closed loop system for generating mechanical energy at high efficiencies. The system can have a heating source, a superheater, an expander, a receiver, an absorber, a desorber, and regenerator with pumps and controls. The superheater heats a working fluid (a refrigerant or steam). A positive liquid/vapor expander expands a low temperature refrigerant, or steam vapor to the saturated state (having both liquid and vapor parts) utilizing a low-pressure sub-atmospheric exhaust sink. An absorber, generates a low-pressure sub-atmospheric sink using chemosorption which involves the exothermic reaction/absorption of ammonia refrigerant in water. The desorber is used to reconstitute inlet vapor (for reuse) and the regenerator recovers heat generated by chemosorption. The system can meet electrical power needs for residences, businesses or office buildings. The system can supply electrical energy to power grids, and can be an alternative power generation plants.

16 Claims, 25 Drawing Sheets

U.S. PATENT DOCUMENTS

| | | | |
|---|---|---|---|
| 5,497,624 A | 3/1996 | Amir | 60/641.5 |
| 5,632,612 A | 5/1997 | Shaffer | 428/55.4 |
| 5,752,816 A | 5/1998 | Shaffer | 418/55.2 |
| 5,758,501 A * | 6/1998 | Jirnov et al. | 60/670 |
| 5,759,020 A | 6/1998 | Shaffer | 418/55.3 |
| 5,950,418 A | 9/1999 | Lott | 60/39.182 |
| 6,050,792 A | 4/2000 | Shaffer | 418/5 |
| 6,129,530 A | 10/2000 | Shaffer | 418/55.1 |
| 6,196,021 B1 * | 3/2001 | Wissolik | 62/606 |
| 6,269,644 B1 * | 8/2001 | Erickson et al. | 60/649 |
| 6,422,017 B1 | 7/2002 | Bassily | 60/653 |
| 6,715,290 B1 * | 4/2004 | Erickson | 60/671 |
| 2001/0001639 A1 | 5/2001 | Shaffer | 418/1 |

* cited by examiner

Watt's data on the Expansion of Steam

ENERGY BALANCE

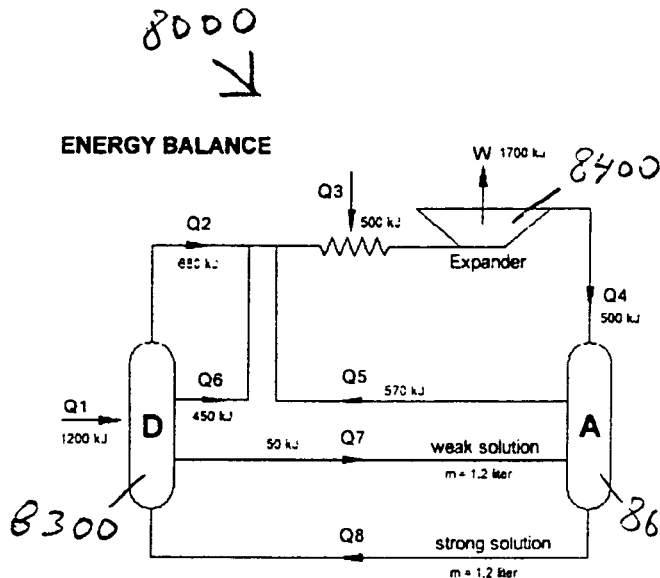

D = Desorber,
A = Absorber,
Exp = Expander
W = expander shaft output

The enthalpies for Q2 and Q4 follow from the ph-diagram above (mind mass factor "x").

Q1 = applied heat from external source
Q2 = enthalpy of released vapor
Q3 = applied heat from external source
Q4 = enthalpy expander discharge
Q5 = enthalpy liquid from absorber
Q6 = enthalpy weak solution from desorber
Q7 = enthalpy injected weak(er) solution
Q8 = unspecified (see below)
m = recycled solution between D and A Balance Conditions:

$D_{in} = Q1 + Q8$    $D_{out} = Q2 + Q6 + Q7$    $EXP_{in} = Q2 + Q6 + Q5 + Q3$
$A_{in} = Q4 + Q7$    $A_{out} = Q5 + Q8$    $EXP_{out} = Q4$ ////////////////////////////////////////////////////////////////////////////////////////////////

$W = Q1 + Q3$    (1)

$EXP_{in} - EXP_{out} = Q2 + Q6 + Q5 + Q3 - Q4 = W = Q1 + Q3$    (2)

$Q1 = Q2 + Q6 + Q5 - Q4$    (3)

$D_{in} - D_{out} = Q1 + Q8 - Q2 - Q6 - Q7$    (4)

(3 & 4 combined, eliminating Q1) → $D_{in} - D_{out} = Q5 - Q4 + Q8 - Q7$    (5)

$-(A_{in} - A_{out}) = Q5 - Q4 + Q8 - Q7$    (6)

Fig. 22

POWER GENERATION METHODS AND SYSTEMS

This invention claims the benefit of priority to U.S. Provisional Application No. 60/544,466 filed Feb. 13, 2004, and this invention is a Continuation-In-Part of U.S. patent application Ser. No. 10/414,672 filed Apr. 16, 2003 now abandoned, which claims the benefit of priority to U.S. Provisional Application Ser. No. 60/372,869 filed Apr. 16, 2002.

FIELD OF INVENTION

This invention relates to energy generation and power supply systems, and in particular to methods and systems that can meet all energy demands of a home or business or industrial use, and allows for excess electrical energy to be available to be sold over transmission grids, and in particular to expansive fluid systems and methods such as steam generation for generating electrical energy, and using co-generated heat byproducts for domestic hot water, room heating and swimming pool/spa heating, and for powering air conditioners and vehicles, and also to expansive methods and systems that use supertrope power packs for condensing vapor such as ammonia gas to condense and converting resulting energy into generated electrical power.

BACKGROUND AND PRIOR ART

Endpoint Power Production

Many problems currently exist for traditional power generation methods and systems. Approximately 95% of the current world's supply of electrical energy is produced from non-renewable sources. Alternative fuels are not practical sources for taking care of all the world's electrical energy needs. For example, solar energy power is too low, not reliable and very expensive. Wind energy is inconsistent, not dependable, expensive, and high maintenance. Geothermal energy requires specific locations to be used. Hydrogen energy has no existing infrastructure to support, distribution.

Global energy demand is increasing at approximately 2% per year. The Department of Energy has forecast by year 2020 that United States will need approximately 403 gigawatts (403 billion watts) and the world will need approximately 3,500 gigawatts (3.5 trillion watts of power). Still, there are more than two billion people in the world who do not have access to electricity.

Demand for electricity is outrunning capacity, and the price mechanism is the essential way to restrain demand and encourage supply. Therefore, the cost of electricity will keep going up.

Current electric utility companies are limited by production capacity to increase their electricity generation. To increase generation, these companies must build additional plants which require substantial capital investments, political issues of where to locate to the plants, lengthy permit procedures lasting several years, cost overruns, which make the traditional method of building additional plants undesirable.

Using nuclear power, oil burning plants, and coal burning plants, adds further environmental problems for those seeking to build electricity generating power plants. Thus, building more and more plants is not a practical solution.

Current energy conversion efficiency of any of these power plants is generally no higher than 30% (thirty percent) efficiency of the electricity produced from the energy source of the fuel(oil, coal, nuclear, natural gas). For example, turbines that generate the electricity from the fuel source at the power plants only generate up to approximately 30% efficiency of the electricity generated from the source.

Next, the electricity being transmitted loses efficiency while it is being transmitted loses energy(efficiency) over transmission lines(i.e. wires, substations, transformers) so that by the time the electricity reaches the end user, an additional 28% (twenty eight percent) energy(efficiency) is lost. By the time the electricity reaches an end user such as a home residence, the true energy efficiency is no more than approximately 18% (eighteen percent) from the actual energy source.

Co-generation heat is the amount of heat that is wasted in the development of the electric power at the plant because heat cannot be transmitted over long distances.

A co-generation combined system does exist where some of the co-generated heat produced from a gas fired plant is used to produce additional steam which then makes additional electricity in addition to the primary electrical generation system. This combined system can achieve up to approximately 45% (forty five percent) energy conversion efficiency. But there still are transmission losses of some 28% (twenty eight percent) so that by the time electricity reaches the end user only some 22% (twenty two percent) of the actual energy source is converted to electrical power.

The current electricity rate structure for consumers penalizes the consumers who must pay for the fuel being used to generate either 18 percent or 22 percent energy conversion efficiency. In essence, the consumer is paying for some 500% (five hundred percent) of the actual cost of electricity by inherent transmission losses that are generated by the current power generation systems.

The inventors are aware of several patents used for steam power generation. See for example, U.S. Pat. No. 3,567,952 to Doland; U.S. Pat. No. 3,724,212 to Bell; U.S. Pat. No. 3,830,063 to Morgan; U.S. Pat. No. 3,974,644 to Martz et al.; U.S. Pat. No. 4,031,404 to Martz et al.; U.S. Pat. No. 4,479,354 to Cosby; U.S. Pat. No. 4,920,276 to Tateishi et al.; U.S. Pat. No. 5,497,624 to Amir et al.; U.S. Pat. No. 5,950,418 to Lott et al.; and U.S. Pat. No. 6,422,017 to Basily. However, none of these patents solves all the problems of the wasteful energy conversion methods and systems currently being used.

Nonexistence of Supertropic Expansion Applications

At present, known thermodynamic changes of conditions of a system do not include supertropic expansion, which is defined as extracting more energy from an expanding gas, than what isentropic expansion gives for a given expansion volume ratio. In this way a vapor can be expanded far into the wet area of its ph-diagram, so a considerable amount of it condenses by doing work, instead of by cooling it to ambient waste.

Currently, it is not possible to convert moderate amounts of heat from external sources into mechanical energy. Steam turbines work on high rotational speeds that increase to impractical values when the machine is scaled down in size. Thus steam turbine sizes range in the megawatts.

Smaller displacement steam expanders would have a too low efficiency. The only alternative external combustion engine in the range of up to a few hundred kilowatts would be the Sterling engine, but it cannot be produced at a compatible cost in relation to internal combustion engines. Besides, as it only works on the specific heat of an inert gas over varying temperatures, the size of a Sterling engine potentially is much larger than for an according steam, or internal combustion engine and so it must work on very high pressure levels to increase the mass of gas contained in the cycle and thus to keep the machine size down. Again, leakage sets the technological limits, though likely economic ones do sooner.

A basic patent that issued to James Watt on Jul. 17, 1782 was an exceedingly important one, and of special interest in the history of the development of the economical application of steam. This patent included: 1. The expansion of steam, and six methods of applying the principle and of equalizing the expansive power. 2. The double-action steam-engine, in which the steam acts on each side of the piston alternately, the opposite side being in communication with the condenser.

FIG. 18 shows the progressive variation of pressure (of the volume j above the piston) as expansion proceeds. It is seen that the work done per unit of volume of steam as taken from the boiler, is much greater that when working without expansion. The product of the mean pressure by the volume of the cylinder is less, but the quotient obtained by dividing this quantity by the volume or weight of steam taken from the boiler, is much greater with, than without expansion. Watt specified a cut-off at one-quarter stroke, after which the steam expands the remaining three-quarters, as usually best. This would do a little more than double the effect, but it would too much enlarge the cylinder and vessels to use it all.

It was found that for the case assumed and illustrated here, the work done during expansion per pound of steam is 2.4 times that done without expansion. This indicated that Watt measured supertropic expansion, because otherwise the work ratio would have been slightly over two, as follows: Lets imagine a cylinder with 1 m2 area(One square meter) and a 4 meter stroke length, thus consuming 4 m3(Four cubic meters) steam of atmospheric pressure under full load per stroke and at 0.25 bar condenser pressure, giving 0.75 bar constant pressure difference over the piston. The work done would then be approximately 75 kappa ×4 m=approximately 300 kJ. With a specific volume of approximately 1.7 m3/kg for the applied steam, we get a specific work of approximately 128 kJ/kg.

As previously mentioned, the inventors are not aware of patents that solve all the problems of the wasteful energy conversion methods and systems currently being used.

SUMMARY OF THE INVENTION

Endpoint Power Production Objectives

A primary objective of the invention is to provide a more efficient method and system to generate electrical power and heat to supply individual homeowners and businesses to make them independent of the traditional electrical company at a much lower cost/efficiency.

A secondary objective of the invention is to provide a method and system to generate electrical power that provides for all the energy needs to supply electricity, hot water, heating and cooling for individual homeowners and businesses.

A third objective of the invention is to provide a method and system to generate electrical power and heat energy for the needs of individual homeowners and businesses, that allows for their excess energy to be sold to others further reducing costs to homeowners and businesses. Current estimates would allow for selling approximately $10,000 to approximately $22,000 per year worth of excess energy to others through an existing electrical power grid.

A fourth objective of the invention is to provide a method and system to generate electrical power to supply all the energy needs of individual homeowners and businesses that is inexpensive. An estimated cost of the novel invention system would be under $10,000 for the entire system.

A fifth objective of the invention is to provide a method and system to generate electrical power and heat that can reduce national energy residential energy consumption substantially over current levels.

A sixth objective of the invention is to provide a method and system to generate electrical power and heat that reduces United States dependency on foreign sources of energy such as oil imports.

A seventh objective of the invention is to provide a method and system to generate electrical power and heat that can use any energy source such as renewable(alcohol, hydrogen, etc) and non renewable(oil, coal, gas, etc.) in an efficient energy conversion method and system.

An eighth objective of the invention is to provide a method and system to generate electrical power and heat that achieves an energy conversion efficiency of approximately 95% (ninety five percent) or greater.

A ninth objective of the invention is to provide a method and system to generate electrical power and heat that does not charge the end user for fuel source energy that is being lost and not being used to generate the actual electricity.

A tenth objective of the invention is to provide a method and system to generate electrical power and heat that can use existing power generation infrastructures such as existing natural gas pipelines, propane gas tanks, and the like.

An eleventh objective of the invention is to provide a method and system to generate electrical power and heat that does not require building new plants, substantial capital expenditures, permitting costs, less political headaches of where to locate plants, and the like.

A twelfth objective of the invention is to provide a method and system to use superheated steam generated by a vaporous fuel source to supply hot water for uses such as but not limited to domestic hot water, home/space heating, and other loads such as pools, spas, and underground piping for ice and snow removal.

A thirteenth objective of the invention is to provide a method and system to use superheated steam generated by a vaporous fuel source to power an airconditioning unit.

A fourteenth objective of the invention is to provide a method and system to use superheated steam generated by a vaporous fuel source to generate electricity for powering commercial and domestic devices.

A fifteenth objective of the invention is to provide a method and system to use superheated steam generated by a vaporous fuel source to power a vehicle such as a car.

Supertropic Power Production Embodiments

A sixteenth objective of the invention is to provide a more efficient method and system to generate electrical power from heat by achieving a mode of a expansion, called "supertropic", that causes the major part of the mass of vapor to condense and convert the according energy into mechanical power.

A seventeenth objective of the invention is to provide methods and systems of using supertropic expansion power packs to generate electrical power for power grids.

An eighteenth objective of the invention is to provide methods and systems of using supertropic expansion power packs to generate electrical power for powering vehicles, such as cars.

A nineteenth objective of the invention is to provide methods and systems of using supertropic expansion power packs to generate electrical power to generate electricity for powering commercial and domestic devices.

Endpoint Power Production Embodiments

The invention can use any potential source of energy, such as renewable and nonrenewable energy, such as but not limited to natural gas, liquid propane gas, and the like, and the invention can run on coal, oil or any fuel that can be vaporized. The invention can also be made to run on water; thru the use of advanced techniques (blue laser, electrolysis) of breaking the bi-polar bond of $H_2O$ and uses the gasses $H_2$ and $O_2$.

A preferred embodiment can have simple and user friendly automated controls controlled by computers and software, that can monitor and control the entire system. The size of the system can be no larger than approximately 3 feet by 4 feet by 5 feet, and weigh no more than approximately 500 pounds, and have an almost silent operation. The novel invention can meet the minimum energy needs of a residential home or business.

At a maximum mode, the embodiments can additionally supply excess electrical energy to sell over a transmission grid, which can generate extra income for the user that can be in the range of approximately $10,000 to approximately $22,000 per year, which can easily pay back the costs to buy the system. The embodiments are scalable and can be built to produce power levels of approximately 20 KW, 30 KW, or more.

Other embodiments of the invention use superheated steam generated from a vaporous fuel source to power electric and shaft driven air conditioning units, vehicles such as cars, and the like.

Supertropic Power Production Embodiments

Supertropic Expansion can be defined as extracting more energy from an expanding gas than what isentropic expansion will give(for a given expansion volumne ratio). In this way a vapor can be expanded far into the wet area of its energy state, so that a considerable amount of the gas condenses from a vapor by doing work instead of just cooling to ambient temperature as a loss. The invention in achieving greater expansion is to provide a vacuum generated by the process of chemosorption of ammonia and water. Ammonia can be a new working fluid, and the water can be part of the chemosorption process.

The inventors have found a way to make the working fluid expand to a much greater extent for a given volume, thereby releasing up to approximately three times or more the energy to do work. An additional benefit of this approach is lowering operating pressures and temperatures.

The chemosorption hardware can include 1) working fluid, 2) Absorber, 3) Desorber, 4) Receiver, 5) Regenerator, 6) Low volume pump.

In operation, the working fluid is heated in the Thermal Generator(TG), enters the invention as a gas, is then expanded Supertropically, delivering power to drive the electric generator(GEN). The gas, as energy, is released, then condensed back into a liquid. The liquid then continues through the absorber, regenerator and desorber in a closed cycle to continuously provide a vacuum condition for Supertropic Expansion to take place.

Preferred embodiments include methods and systems that achieve a mode of expansion of a vapor, called "supertropic", that causes the major part of the mass of vapor to condense and convert the according energy into mechanical power.

Novel methods and systems can be used for converting moderate amounts of heat into mechanical energy at high efficiencies, by supertropically expanding a gas vapor such as ammonia, and the like, against a vacuum, as generated by chemosorption, in order to convert moderate amounts of heat into mechanical energy at high efficiencies. A Preferred embodiments of a supertropic energy generating package system, can include a gaseous source such as but not limited to ammonia and water, a thermal generator for heating the source of ammonia/water and generating a gas, a scroll expander for expanding the gas, and an electricity generating power source, such as a motor/alternator being driven by the expanding gas.

Further objectives and advantages of this invention will be apparent from the following detailed description of the presently preferred embodiments which are illustrated schematically in the accompanying drawings.

BRIEF DESCRIPTION OF THE FIGURES

Endpoint Power Production

Supertropic Power Production

Figure 18:
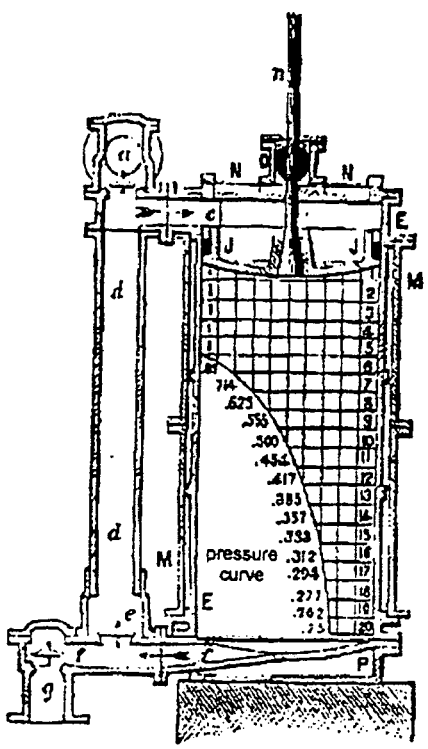

FIG. 18 shows a prior art view of the progressive variation of pressure(of the volume) above a piston in a steam engine.

Figure 19A:
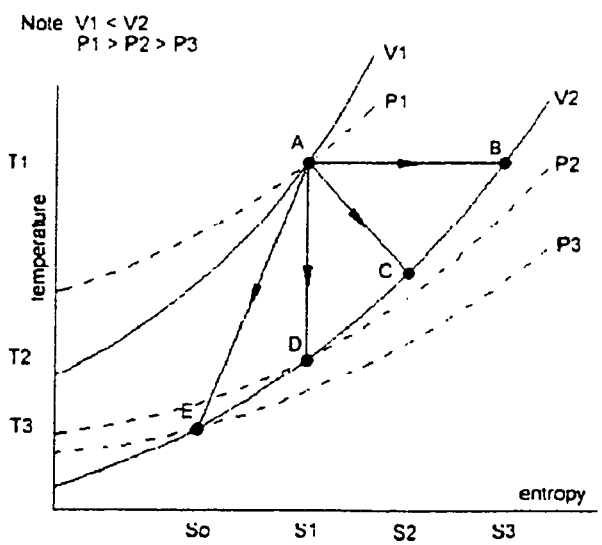

FIG. 19A is a pressure volume graph of temperature versus entropy for supertropic expansion.

Figure 19B:
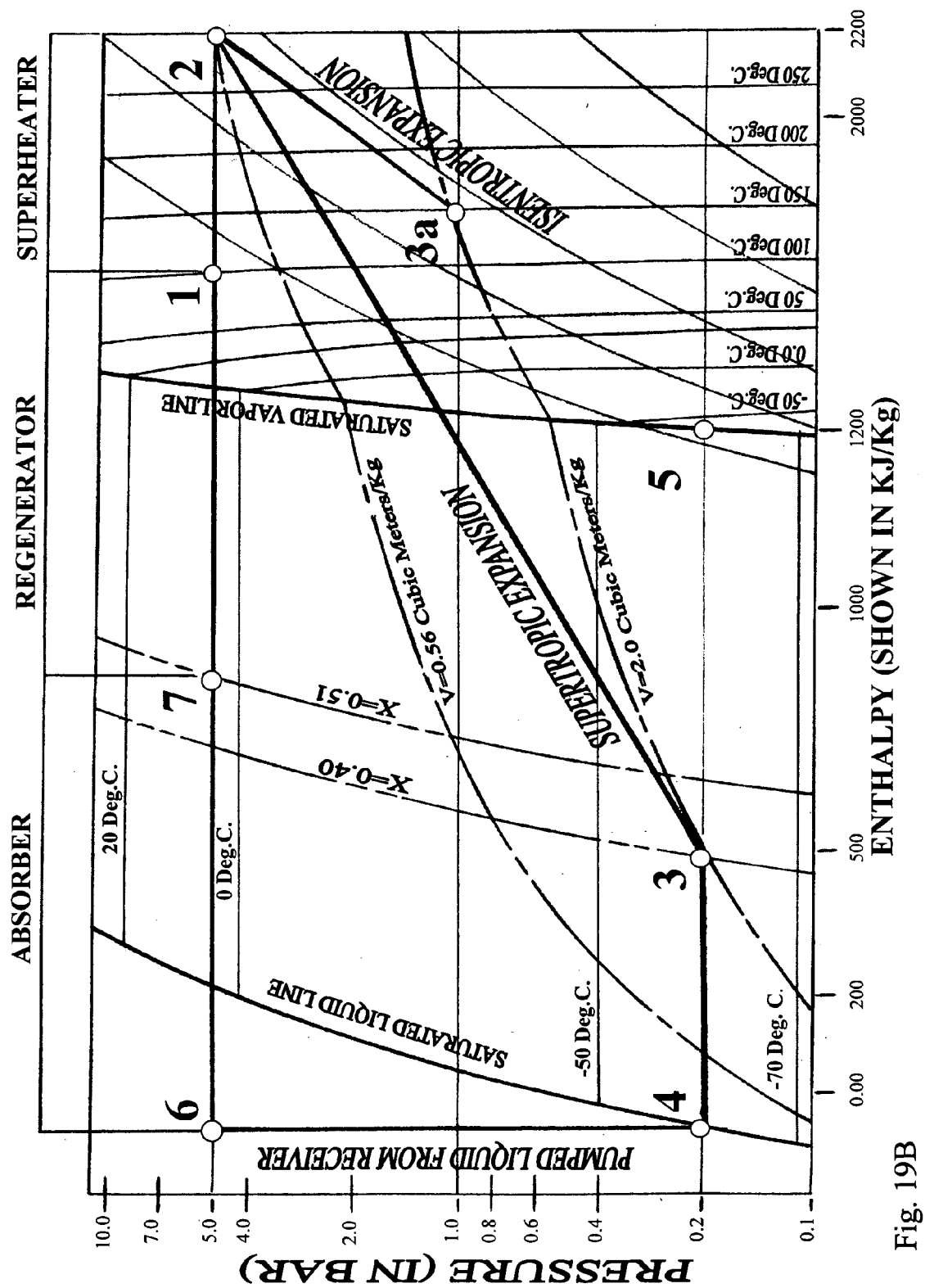

FIG. 19B shows a pressure versus Enthalpy graph for the invention.

Figure 20:
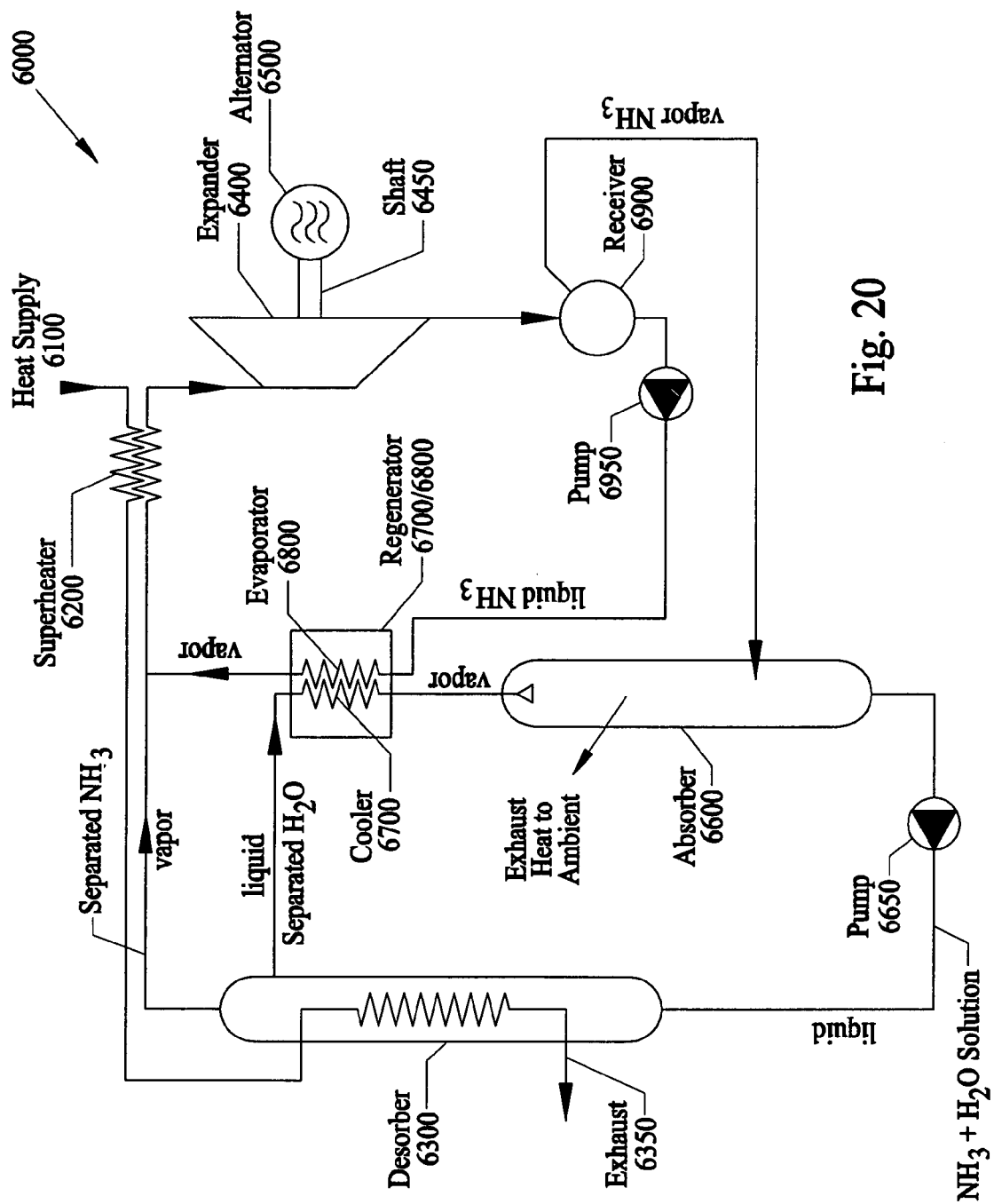

FIG. 20 shows an operational arrangement configuration for a supertrope power system.

Figure 21:
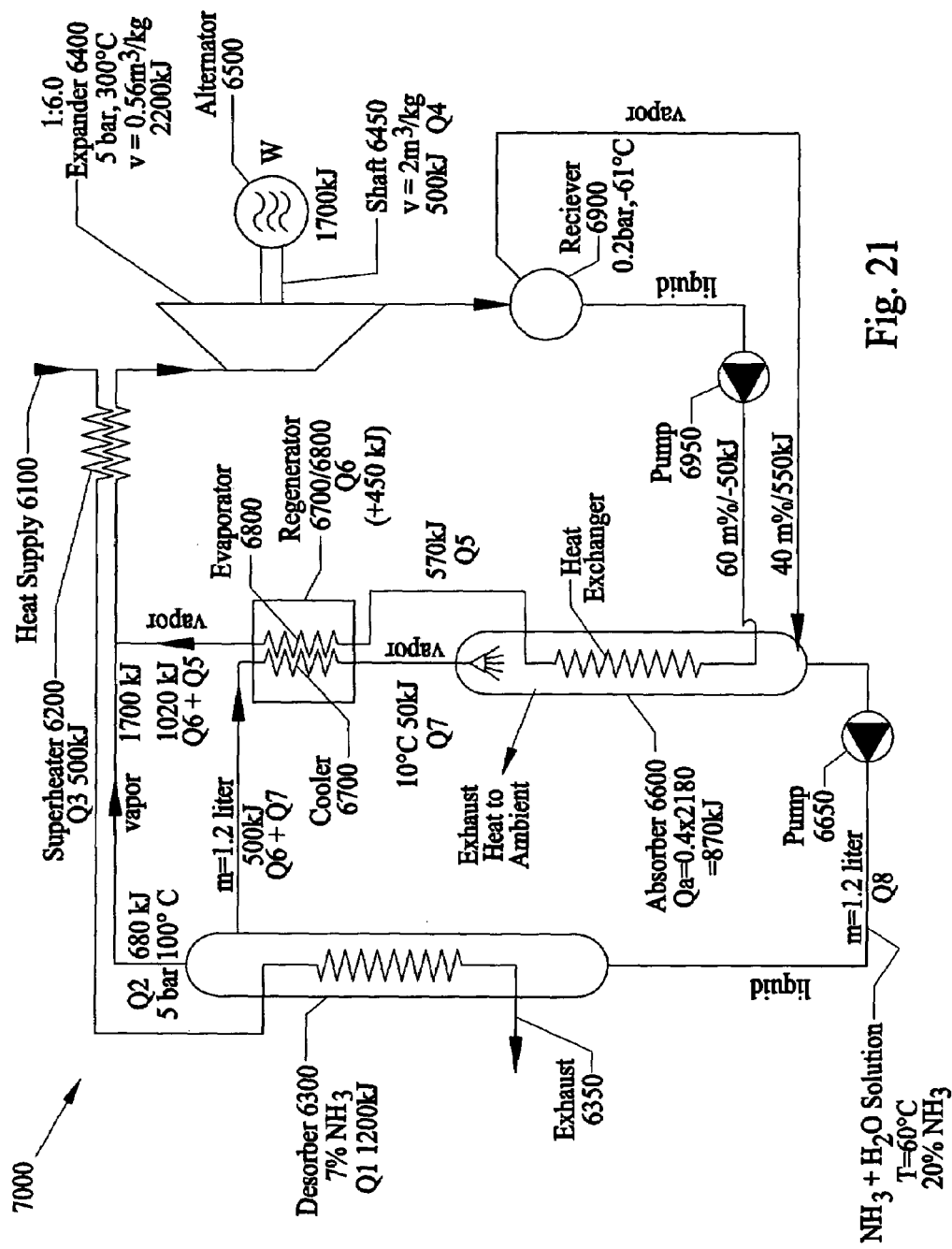

FIG. 21 shows an energy balance diagram for the supertrope power system of the invention.

FIG. 22 shows another version of the supertropic power system of FIGS. 20–21 with a gas/air mixture heat source and superheater based on forced gas/air combustion.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Enpoint Power Production Embodiments

Figure 1:
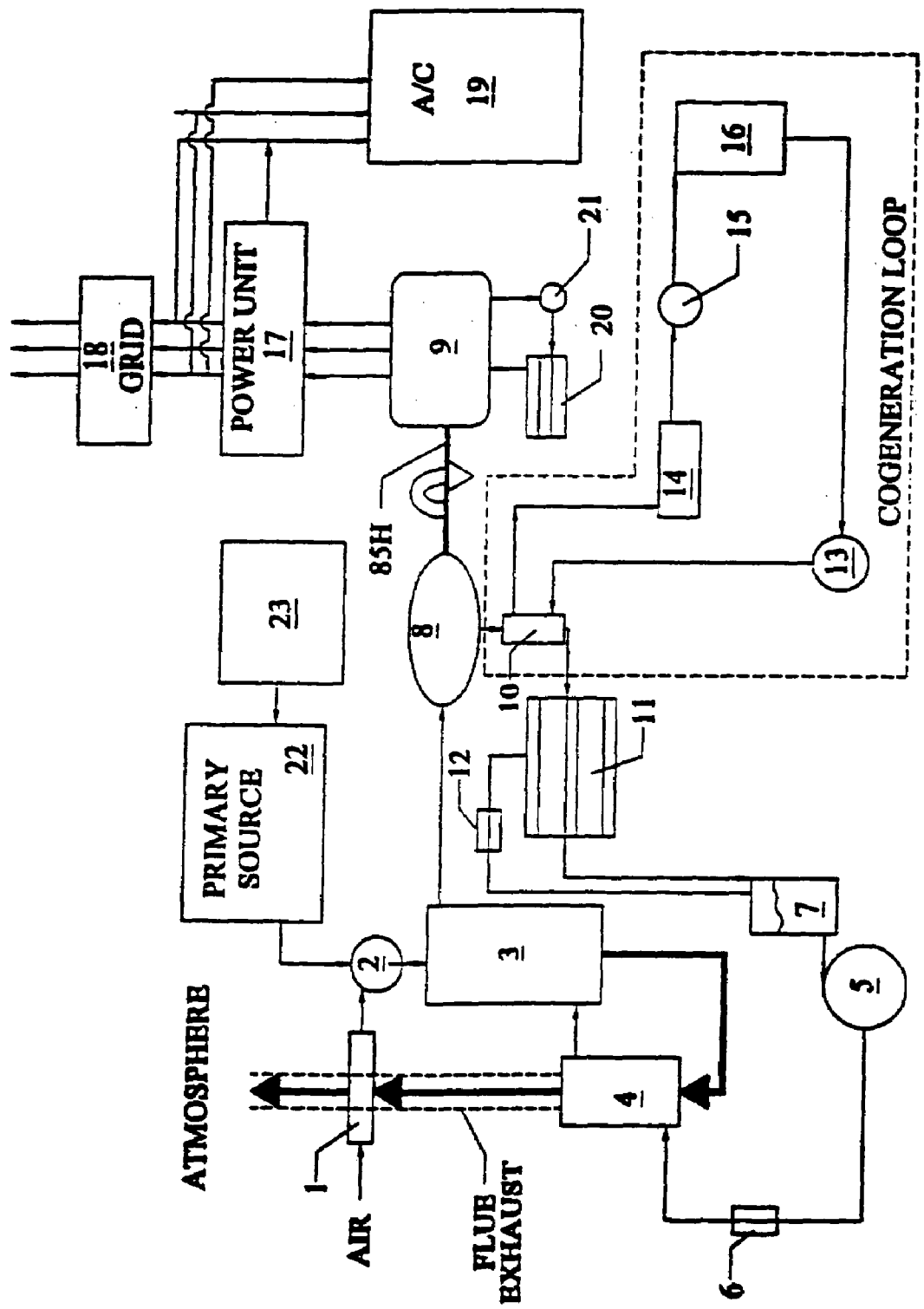
FIG. 1 is an overview diagram of a first preferred embodiment of the invention.

FIG. 1 is a flow chart diagram of a preferred embodiment system of the invention. Initially, ambient air coming through an air preheater (1 FIG. 1, shown in FIG. 4). The heated air is mixed with natural gas or propane in the airblower/valve assembly 2 FIG. 1(such as but not limited to an AMETEK Variable Speed Power Burner Blower, or EBM, with gas metering devices such as those manufactured by Honeywell and Carl Dungs, and the like. The airblower/valve assembly 2 supplies the air required for the combustion process from a primary fuel source 22. The forced air blower can be sized based on the application and/or requirements of the heat generator 3 FIG. 1. The gas metering portion of the airblower/valve assembly 2 provides the gaseous fuel (natural gas, propane, and the like.) required for the combustion process. This device can regulate the amount of gaseous fuel to provide the optimum stoic metric air to fuel ratio (e.g. for natural gas, that ratio is approximately 10 to approximately 1). The gaseous fuel enters the forced air stream through the device. Alternative fuels can be used as a back up fuel source 23, if the current fuel supply is disrupted. The device can automatically shift to the back up source 23, such as but not limited to propane tanks, by switching to a different orifice and other adjustments which can automatically occur.

The invention can incorporate the latest in modulating blower, valve 2 and burner technology in heat generator (boiler) 3. This allows the proper air/gas mixture at all inputs determined by a feedback signal from the electric load placed on the electric generator 9.

Figure 2A:
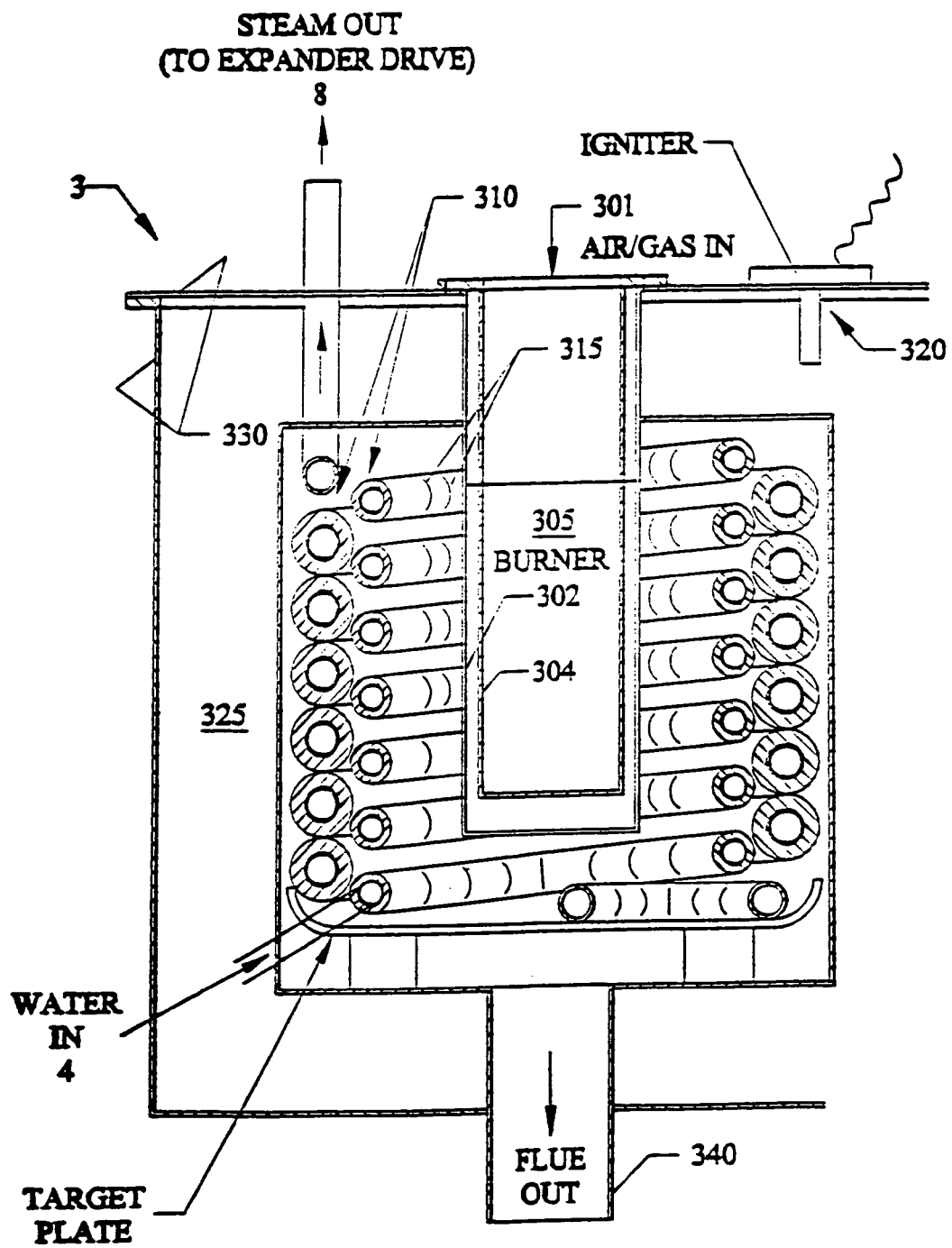
FIG. 2A is a cross-sectional view of a first version heat generator(boiler) for the embodiment of FIG. 1, and can be used for compact spaces when space restricts height dimensions of a boiler of a double coil embodiment.
Figure 2B:
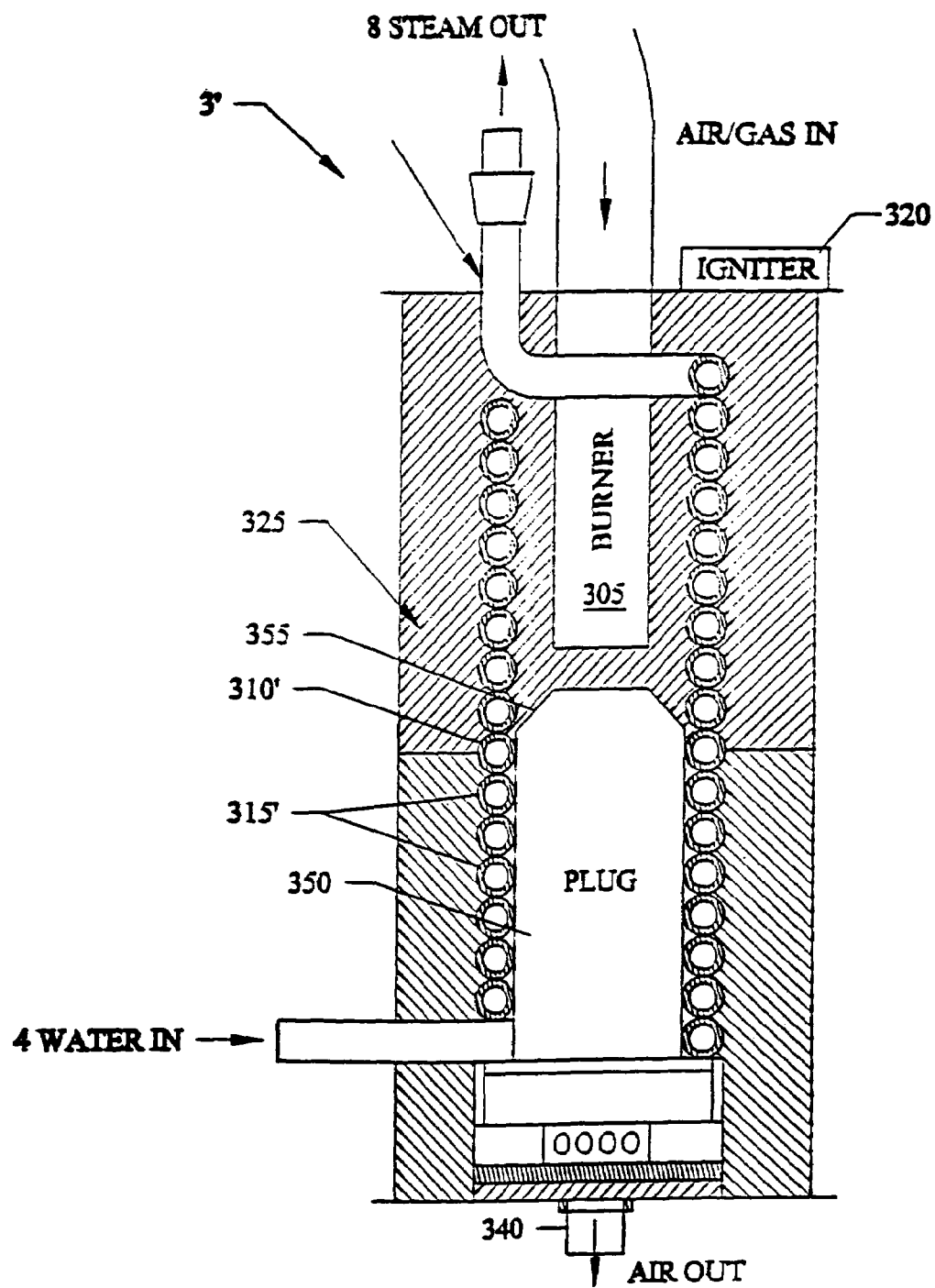
FIG. 2B shows a cross-sectional view of a single wrap fin coil heat exchanger(boiler) for the embodiment of FIG. 1 that can be used where height restrictions are not a problem.

The proper gas air mixture (approximately 10 air to approximately 1 gas) is injected by blower 2(a combination air blower fan and gas metering device) into a burner inside the heat generator unit(boiler) 3 FIG. 1 (shown in FIGS. 2A and 2B). Heated combusted gases heats the incoming water from the closed loop system(12, 11, 7, 5, 6, 4 FIG. 1). Exhausted flue gasses from boiler 3 pass through heat recovery 4 FIG. 1(shown in FIG. 3), after heating incoming air exhausts into the atmosphere.

Figure 5A:
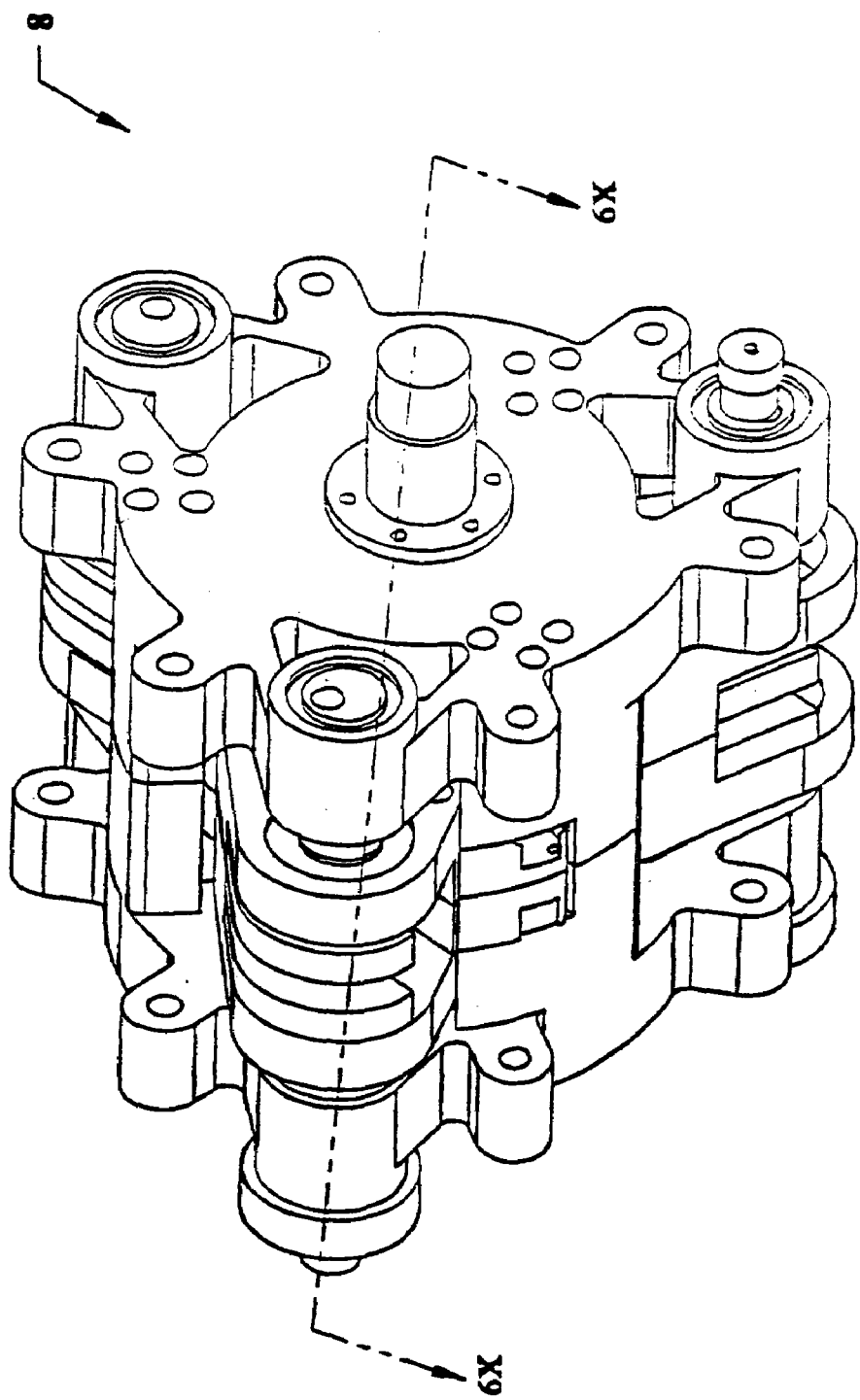
FIG. 5A is a perspective view of an expander driver for the embodiment of FIG. 1.
Figure 5B:
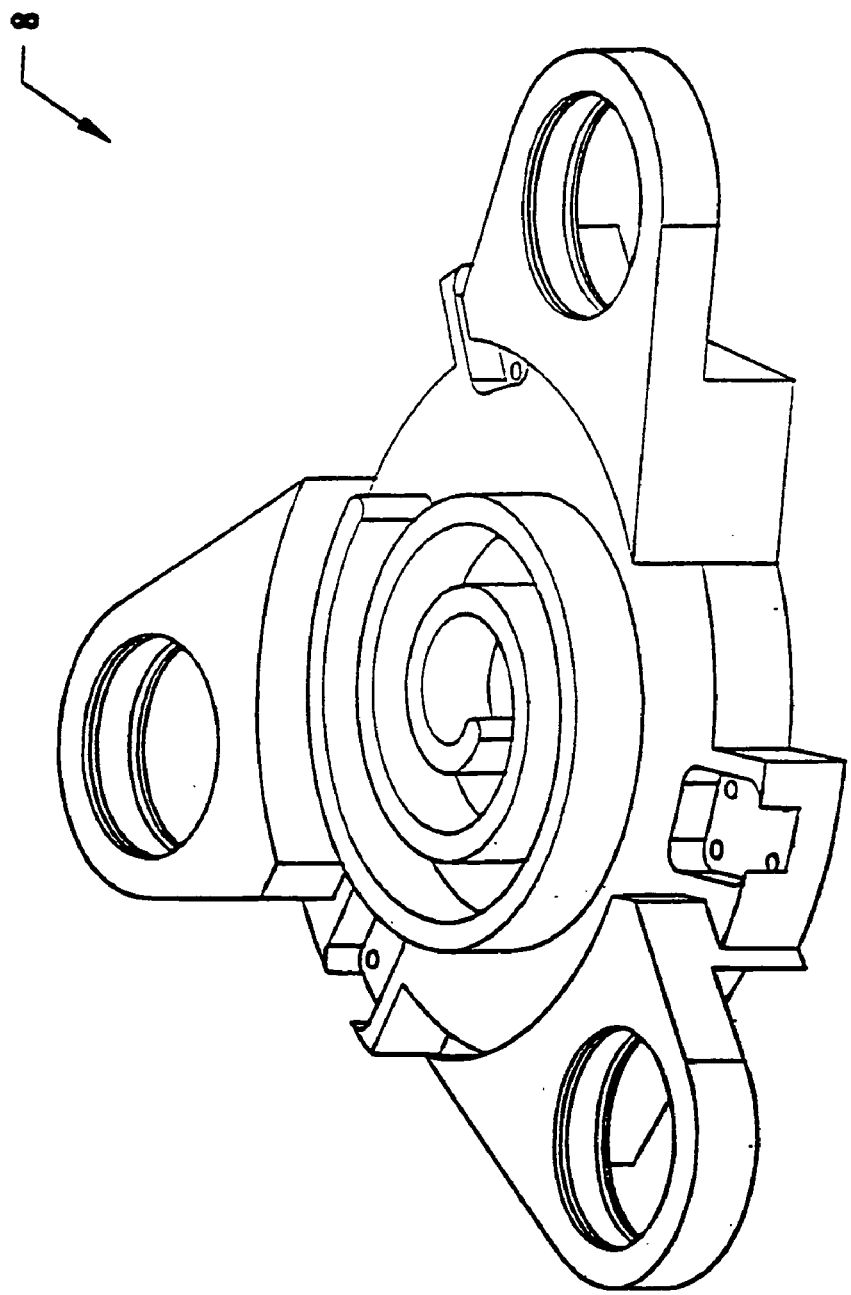
FIG. 5B is an exploded view of the expander driver of FIG. 5A.
Figure 6:
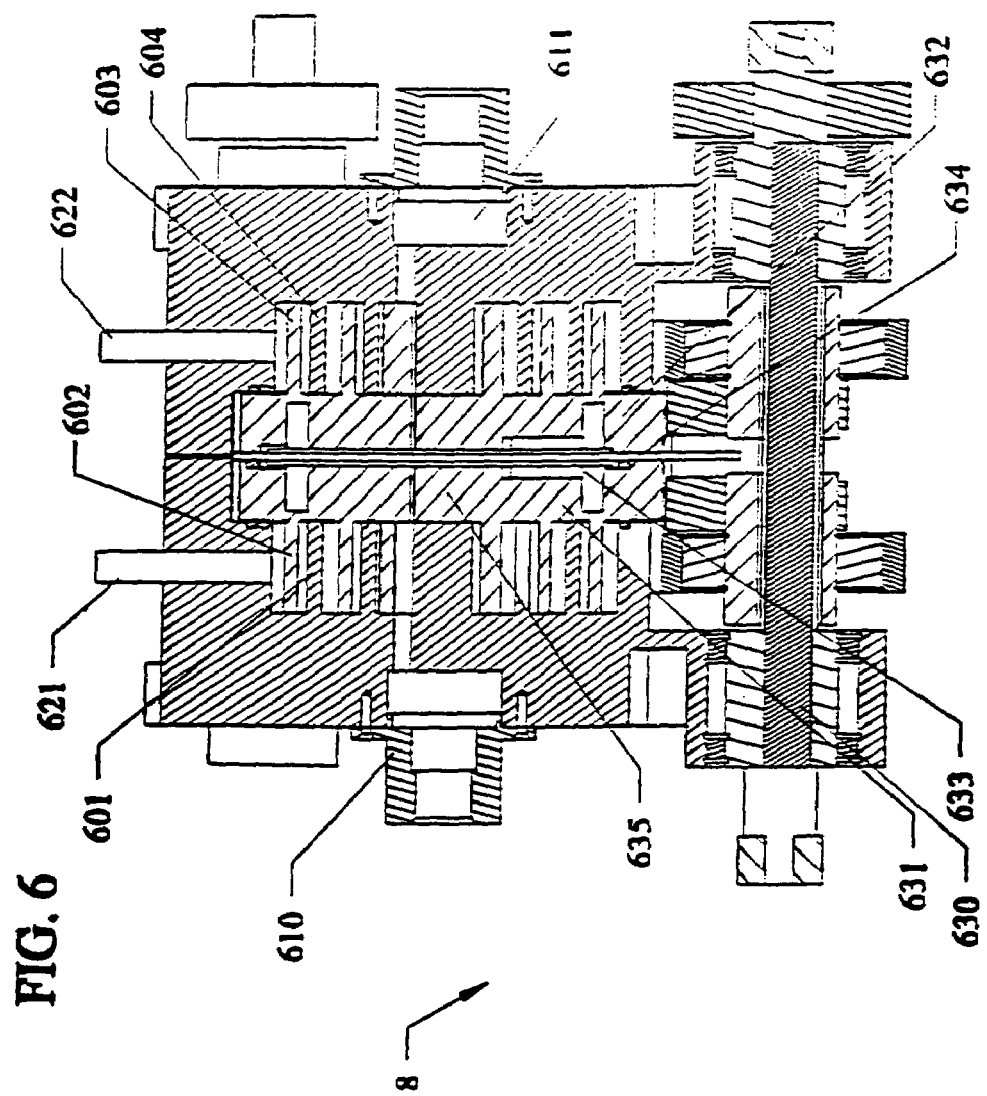
FIG. 6 is a cross-sectional view of the expander driver of FIG. 5A along arrows 6X.
Figure 11:
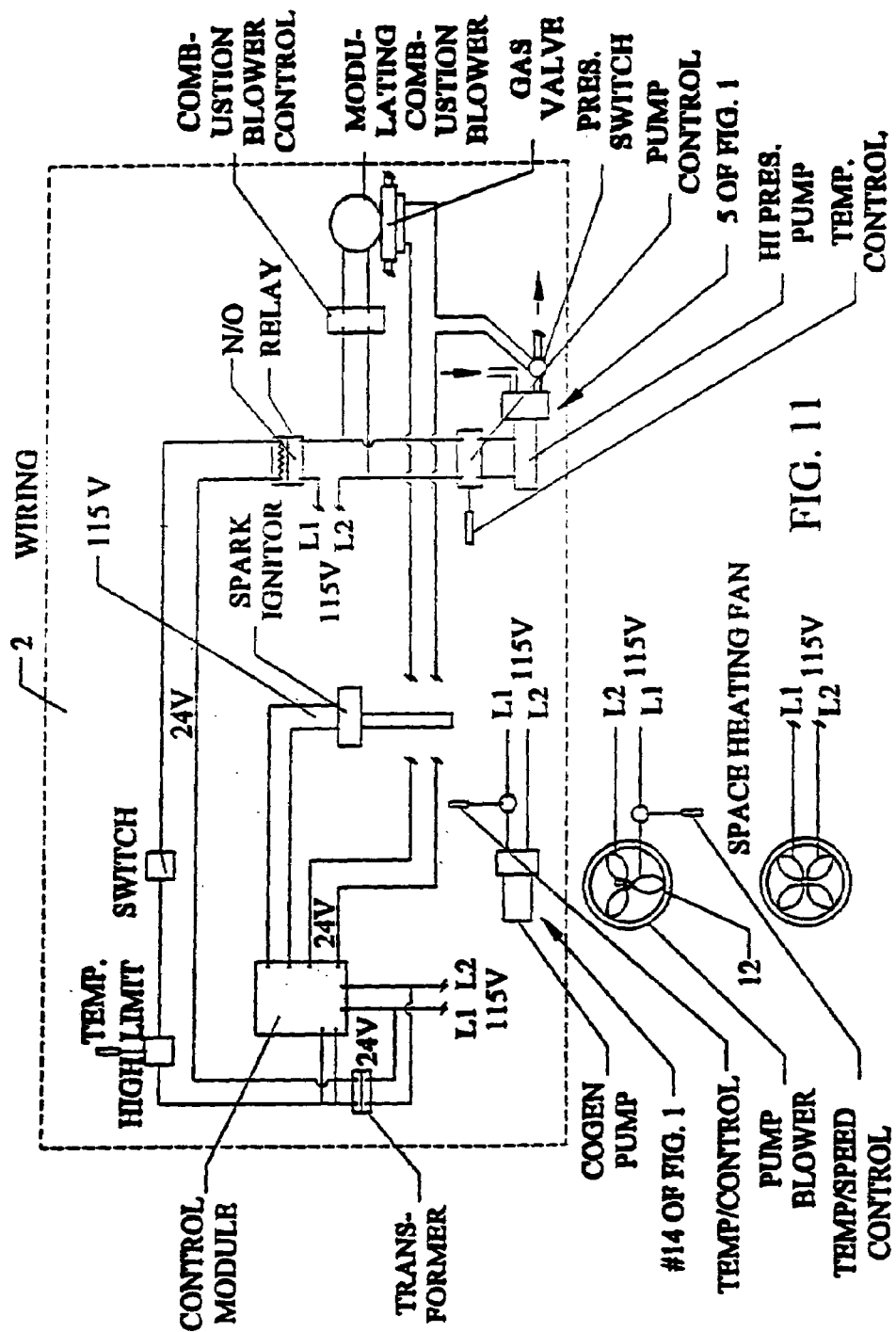
FIG. 11 shows a wiring diagram for various components for FIG. 1.

Steam generated in boiler(heat generator) 3FIG. 1(FIGS. 2A or 2B) at a temperature of approximately 1000 F and approximately 600 PSI enters expander 8 FIG. 1 (FIGS. 5A, 5B and 6). This steam in expander 8 causes a shaft 8SH in the expander to turn, the shaft SH is connected to electric generator 9 FIG. 1(FIG. 11). Electric generator 9 can be a commercial off the shelf generator(COTS) such as Lite Engineering Inc., Marathon, e-Cycle. A preferred generator 9 can be a 240 Volt three-phase AC power supply, or 120 Volt single phase AC power supply, and the like.

Figure 10A:
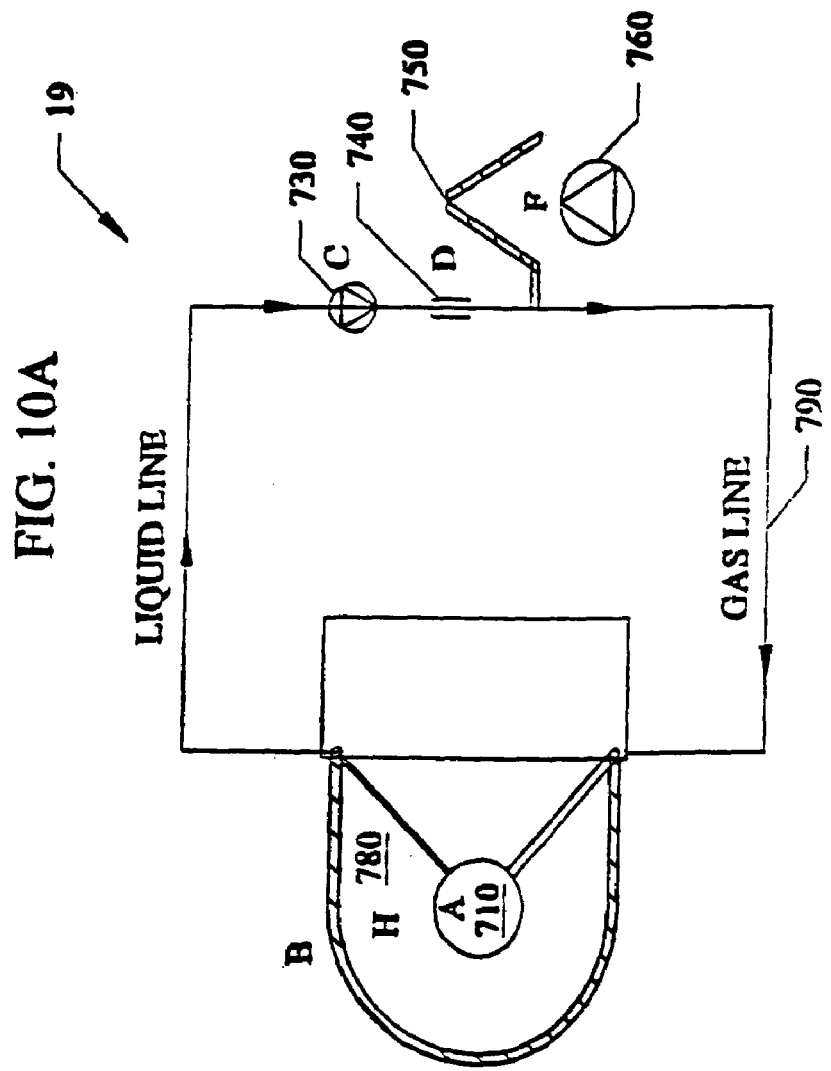
FIG. 10A shows a top view of the air conditioner unit and system of FIG. 1.
Figure 10B:
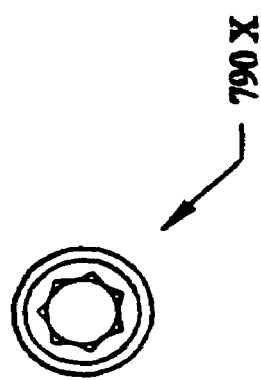
FIG. 10B is a cross-section of the novel rifled and turbulator tubing used in the A/C unit 19 of FIG. 1.

Referring to FIG. 1, electricity produced goes through a power conditioning unit 17 FIG. 1 such as those commercial off the shelf units that come with the electric generator 9 previously described to be put in proper phase and frequency for generation into an electrical power grid 18 FIG. 1. Electric power grid 18 can be an existing grid that supplies electrical power to commercial, industrial and residential applications, such as but not limited to FPL(Florida Power and Light) electric power supply grid. Also, electricity generated out of power conditioning unit 17 powers air conditioner 19 FIG. 1(FIGS. 10A–10B). The power conditioning unit 17, can be an off-the-shelf unit manufactured by Lite Engineering Inc. which adjusts parameters such as phase and harmonics coming out of electric generator 9 and such as a standard AC to DC type converter, and the like.

Heat dissipating units 20, 21 can consist of liquid pump and fan21 and standard heat exchanger(for example, a radiator, tubes with fins, and the like) 20, which cools off generator 9 FIG. 1 and keeps generator at a temperature of approximately 130 F or less. Pump portion 21 can be a fractional horsepower circulator of an anti-freeze solution, such as those manufactured by TACO, Grundfos, and the like. Fan portion 21 can be a pancake style blower of approximately 50 CFM(cubic feet per minute) operating at approximately 115 volts such as one manufactured by EBM, and the like. A heat sensitive speed controller(thermostat) such as one manufactured by Honeywell, and the like, can be built into the fan portion, to operate the fan.

Co Generation Loop.

Figure 3:
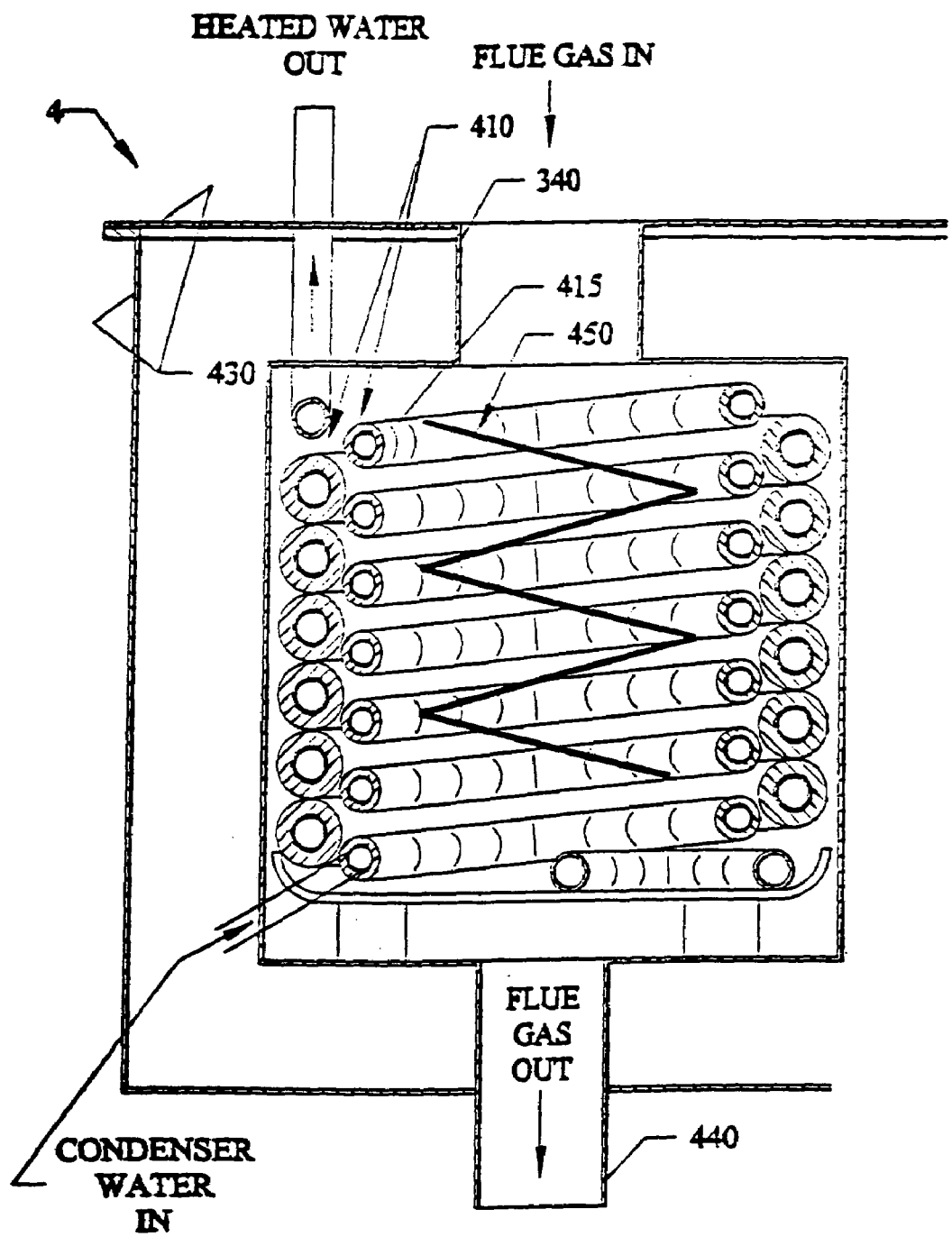
FIG. 3 shows the heat recovery unit for the embodiment of FIG. 1.
Figure 7:
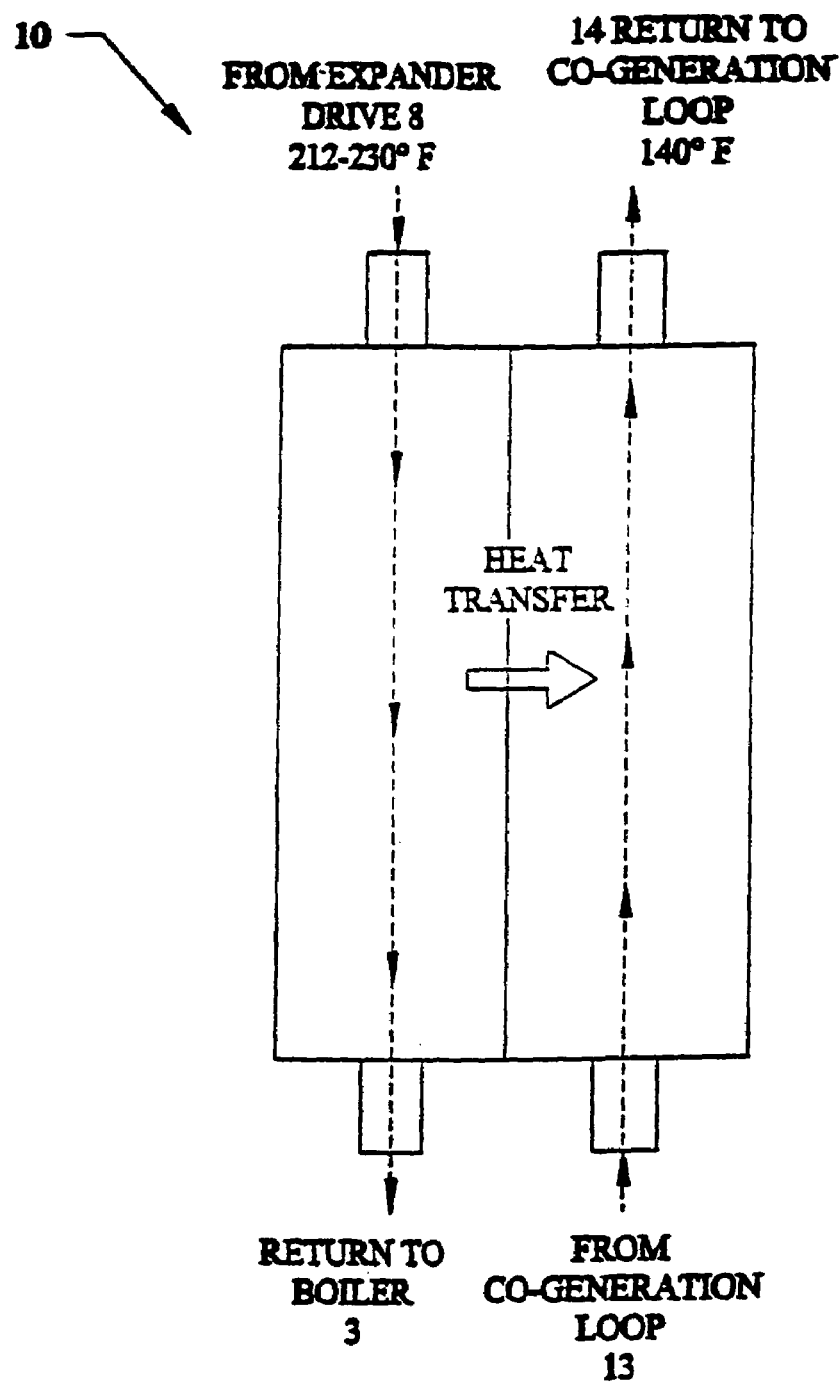
FIG. 7 shows the steam to water exchanger(Co Generation Steam condenser) for the embodiment of FIG. 1.

From Expander 8 FIG. 1(FIGS. 5A, 5B and 6), the steam exhausted goes to a steam to water exchanger 10 FIG. 11(FIG. 7) to a pump 14(Off the shelf water circulator) to a domestic water heater 15, to hot water air heating coil 16 such as a room/house hot water space heater(a coil passing through a fan, to other loads 13, such as but not limited to a swimming pool, a spa, underground pipes for ice and snow removal, and the like. Next, the same hot water passes back at a reduced temperature of up to approximately 30 F, to heat exchanger 10 FIG. 1(FIG. 7). When co generation loop is completely satisfied(i.e. all the hot water is heated up in domestic water heater 15, no more heat is required for heating house 16, pool/spa is at desired temperature) then in order to dissipate this excess heat, it passes from heat exchanger 10 to steam dissipation coil 11 FIG. 1 (FIGS. 8A–8B), where condensed water is placed into accumulator 7(water storage tank) by way of dissipation coil vent check valve, which relieves built up vapor. Then, the high pressure condensate return pump 5 FIG. 1(FIG. 9) pumps water to check valve 6(keeps water from going backward). Pump 5 can run at approximately 600 to approximately 1,000 psi. Water is then passed to heat recovery unit(reclaimer) 4 FIG. 1(FIG. 3). Water can be heated in recovery unit(reclaimer) 4 and is pumped by a high pressure pump 5 into steam generator(boiler) 3 for heating back into steam to complete the cycle of the entire system, where heat generator(boiler) 3 can operate at a temperature of approximately 1,000 F to approximately 1,500 F.

In the cogeneration loop of FIG. 1, steam exits the expander drive 8 at a temperature at approximately 212 F to approximately 230 F This steam passes through the steam to water exchanger 10(FIG. 7), such as but not limited to a Alfa Laval CB-14 a COTS item to extract the heat of the steam and transfer it to the co generated water to be used for domestic hot water, heating water to be used for domestic hot water 15 for heating water and other water usages 13 such as but not limited to pools, snow melting, and the like. This co generated water is pumped by a COTS circulator pump 14, such as but not limited to a Taco or Grundfos pump, and the like. In a situation where all co generated usages are satisfied the excess heat(steam) continues on to the heat dissipation coil 11, such as one manufactured by Heatcraft or other steam condenser manufacturers.

Figure 9:
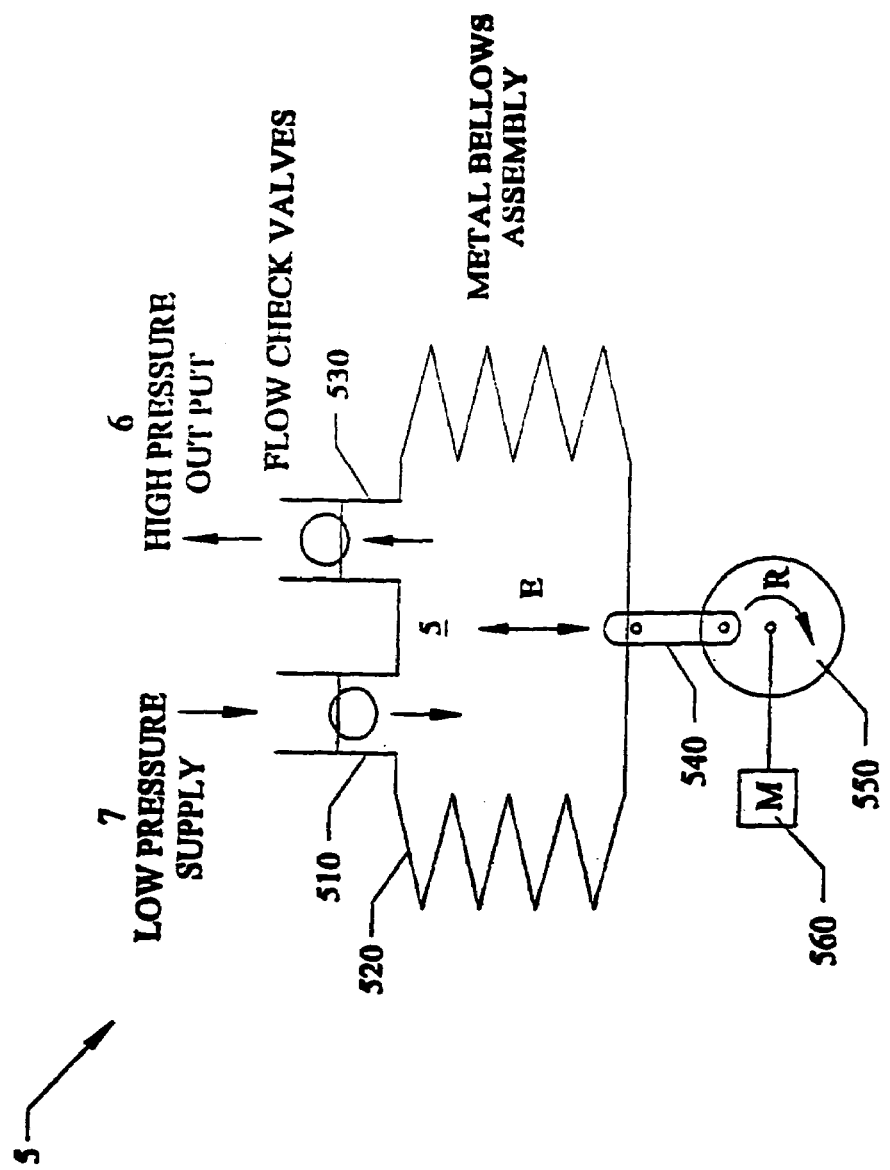
FIG. 9 shows the condensate return pump(high pressure return pump) for the embodiment of FIG. 1.

The condensed steam is now changed to water which gave up its latent heat to the co generated water. The closed loop steam, now water, is transferred to the accumulator 7 directly bypassing check valve ready to be returned to the heat generator 3 by the high pressure bellows pump 5 (FIG. 9).

FIG. 2A is a cross-sectional view of a first version heat generator(boiler) for the embodiment of FIG. 1, and can be used for compact spaces when space restricts height dimensions of a boiler. Air blower (2 FIG. 1) forces an air/gas fuel mixture to enter burner. Gas/fuel meter in blower/meter 2(FIG. 1) provides the gaseous fuel (natural gas, propane, and the like) from primary fuel source 22(FIG. 1) required for the combustion process. This device will regulate the amount of gaseous fuel to provide the optimum stoic metric air to fuel ratio (e.g. for natural gas, that ratio is 10 to 1). The gaseous fuel enters the forced air stream. Alternative fuels from a backup fuel source 23(FIG. 1) can be used as a back up if the current fuel supply is disrupted. The device can automatically shift to the back up source 23, such as but not limited to propane tanks, by switching to a different orifice and other adjustments can be made automatically.

The burner screens 302, 304 located inside the body of the heat generator 3, is where the fuel and air mixture is ignited and burned. The burner 305 consists of two cylindrical (inner and outer) screens 302, 304. The purpose of the dual screens 302, 304 is to prevent flashbacks from the combustion of the fuel and air mixture. The screens 302, 304 can be made of Inconel or other high temperature materials, and the like.

Referring to FIG. 2A, heat exchanger(double wrapped tubes 310) are wrapped around the burner 305 and can be constructed of approximately ⅝" 321 stainless steel tubing with external outwardly protruding fins 315. The working fluid(water) is pumped through the heat exchanger (b pump 5 FIG. 1, 9 at approximately 600 to approximately 1000 psi), where it is heated from an approximately 150° F. entering temperature to a leaving temperature of approximately 1000 to approximately 1300° F. (nominal, approximately 1500° F. maximum) at approximately 1000 PSI. Once the working fluid is heated it will then go to the expander drive 8(FIGS. 5A, 5B and 6).

An electrically powered igniter module 320 attached to the heat generator 3 adjacent to air/gas inlet line 301 can provide the necessary energy (spark) to start the combustion process. The insulation 325 within heat generator housing 330 retains the heat that is generated during the combustion of the fuel and air mixture within the heat generator cavity to maximize the heat transfer to the heat exchanger (wrapped tubes 310). The insulation 325 can be composed of aluminum and silica or other high performance insulation, and the like. Exterior outer generator housing 330 can be composed of stainless steel, aluminum, high temperature plastic, and the like, and houses the insulation 325, heat exchanger 310, and burner screens 302, 304.

A downwardly extending flue 340 exhausts the products of combustion (flue gases). The flue gases, which are very friendly to the environment are primarily carbon dioxide and water vapor with trace amounts (ppm) of CO. A minimal amount of heat ($\leq$ approximately 2% of total heat generated) is also lost through the flue. The flue gases can be harmlessly exhausted to the atmosphere.

Water entering heat generator(boiler) 3 FIG. 1, FIG. 2A from heat recovery(reclaimer) 4 FIG. 1) is pumped to flow through the double wrapped finned coiled heat exchanger tubes 310, and exits the boiler at approximately 1000 F to approximately 1500 F to pass to the expander drive 8 FIGS. 1, 5A, 5B and 6.

FIG. 2B shows a cross-sectional view of a single wrap fin coil heat exchanger(boiler) 3' for the embodiment of FIG. 1 that can be used where height restrictions are not a problem. In FIG. 2B, a plug 350 such as a high temperature insulation material previously described is positioned below a burner, and is used for directing the forced air combustion against the exterior fins on the single layer of wrapped fin covered coil tubes 310'. The upper end 355 of the plug 350 can be chamfered/tapered, and can be conical, and the like. Air swirls and turbulates about the fins 315' which are about the coil tubes 310' to maximize heat transfer from the burner 305 to the water circulating through the coils 310'. The other components in FIG. 2B function similarly to those described in reference to FIG. 2A.

The heat generators 3 and 3' of FIGS. 2A–2B produce steam to provide motive power to the system expander. FIG. 2A uses a mono-tube 310 wrapped about it itself, and FIG. 2B is a single wrap mono-tube 310'. The mono-tube 310/310', has a very small fluid capacity(0.64 gallons of distilled water). Any leakage would release the steam without any explosive power and therefore is a safe device even at the operating pressure of approximately 600 to approximately 1000 psi and temperatures of approximately 1000 to approximately 1300 F with a maximum of approximately 1500 F. The pressure drop would immediately shut off fuel supply and stop the system operation.

The forced combustion blower and a modulating gas valve 2 FIG. 1, are controlled by the ignition module 320 in FIGS. 2A–2B, which delivers a mixture of fuel gas and air to the burners 305 within the heat generator(boiler) 3, 3' of FIGS. 2A, 2B. The burner 305 can be one manufactured by Burner Systems Inc. or Cleveland Wire Cloth, where the combustion takes place on the burner surface 302, 304 to heat the water to steam in the heat generator tubes 310, 310'.

The tubes 310, 310' in the heat generators 3, 3' of FIGS. 2A–2B can include approximately 0.018, approximately 321 stainless steel fin material of approximately 0.125 and approximately 0.25 height wrapped and brazed around at approximately 14 to approximately 11 fins per inch. An approximate 0.625 ID(internal diameter), approximate 321 stainless steel tube of approximately 0.083 wall as required to meet the required pressure vessel codes.

Referring to FIGS. 2A–2B, heat can be absorbed by the helix(helical) coil tubes 310, 310' from radiation from the burner flame in burner 305 and from convection of the products of combustion of forced combustion burner 305, to produce output steam flow rate of approximately 95 pounds per hour at approximately 600 psi and approximately 1000 F.

Water in the heating coils 310, 310' can be heated through the saturated steam range into the superheated steam range realm all in one heat generating path as opposed to standard methods using two stage steam systems with a separate super heat section.

FIG. 3 shows the heat recovery unit(liquid condensate heat exchanger) 4 for the embodiment of FIG. 1. Flue gas from bottom extending flue 340 passes into a chamber having double wrapped mono-tube finned 410 heat exchanger, and maximizes heat efficiency to water passing through the double wrapped tubes 410 within a housing 430(similar in material to the housing 330 of the heat generator 3. The Liquid Condensate Heat Exchanger (Reclaimer) 4 captures waste heat in the flue 340, which adds to the overall efficiency of the invention. This heat exchanger 4 can be constructed of approximately 321 C stainless steel tubing 410 with external fins 415.

The flue heat reclaimer 4 in FIG. 3 captures heat from the flue gas exhaust to raise the temperature of the water from the steam condenser 10 FIG. 1 before it is pumped by the high pressure pump 5 FIG. 1 into the heat generator 3 FIG. 1.

Built of the same materials as the heat generator 3 FIG. 1 and able to withstand the pressure that exists in the heat generator 3: a spiral baffle 450 can be used to distribute the flue heat to all the tubes 410 for proper heat transfer.

Figure 4:
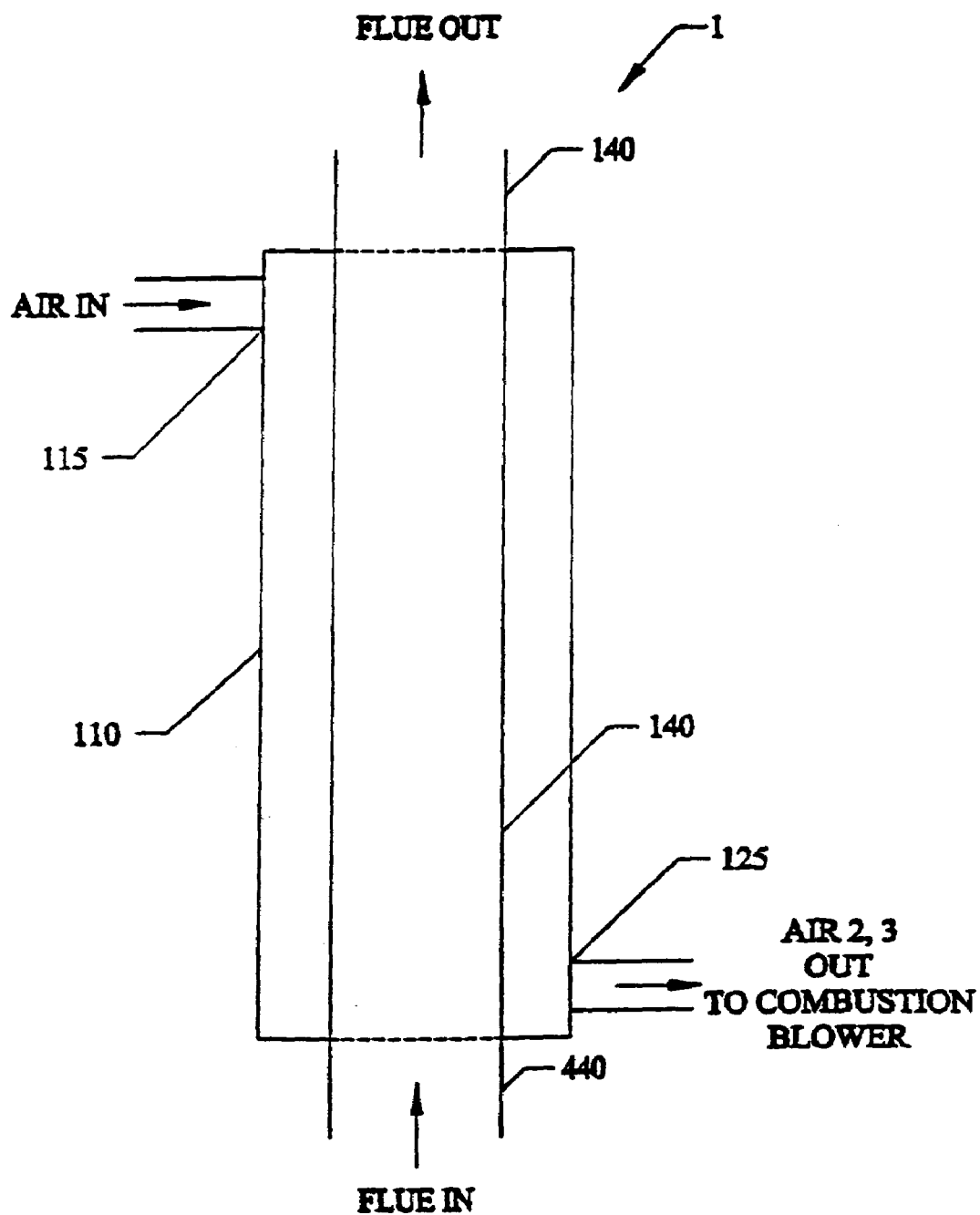
FIG. 4 shows air preheater component for the embodiment of FIG. 1.

FIG. 4 shows air preheater component 1 for the embodiment of FIG. 1. A combustion air pre-heater increases the efficiency of the combustion burner 205 of FIGS. 2A, 2B by capturing the heat usually wasted in the flue 440, 140. Energy needed to heat the air in combustion is lowered, increasing the efficiency of the overall system. The preheater 110 can be made of stainless steel materials for long life. Ambient air can be pulled into an opening 115 in the annular chamber 110 surrounding the flue 440, 140, by a combination fan/blower and gas meter 2 FIG. 1 pulling the heated air out of opening 125 to be directed into the heat generator(boiler) 3 FIG. 1.

FIG. 5A is a perspective view of an expander driver 8 for the embodiment of FIG. 1. FIG. 5B is an exploded view of the expander driver of FIG. 5A. FIG. 6 is a cross-sectional view of the expander driver of FIG. 5A along arrows 6X.

The expander drive 8 converts the thermal energy of the working fluid into mechanical (rotational) energy to drive the generator or any other mechanical device.

FIGS. 5A, 5B and 6 show an expander drive system based Scroll Labs "floating scroll" technology (see U.S. patent Ser. No. 10/342,954 filed Jul. 6, 2004, now U.S. Pat. No. 6,758,659 to one of the inventors of the subject invention, which is incorporated by reference) for the subject invention. The scroll device 8, used as compressors, expanders and vacuum pumps, are well known in the art. In traditional scroll device there is a set of scrolls including one fixed scroll and one orbiting scroll making circular translation, orbiting motion, relative to the former to displace fluid. In a floating scroll device there are two sets of scrolls, front and rear scrolls. Each set of scrolls, front or rear, consists of a fixed scroll and an orbiting scroll. Floating scroll technology adopts dual scroll structure. FIG. 5A is a perspective view of the external appearance of a floating scroll expander 8. FIG. 5B is an exploded view of the expander 8 of FIG. 5A which shows the internal orbiting scroll of floating scroll expander.

Referring to FIG. 6 the working principle of the floating scroll expander is explained. Front fixed scroll 601 and rear fixed scroll 604 are engaged with front orbiting scroll 602 and rear orbiting scroll 603, respectively. The front and rear orbiting scrolls of the dual scroll are arranged back to back and orbit together and can make radial movement relative to each other during operation.

For simplicity, below we will only describe the working principle of the front scrolls. The working principle of the rear scrolls is similar. The steam enters the expander 8 from the inlet port 610 at the center of the front fixed scroll. The steam is then sucked into the expansion pockets formed between the scrolls and is expanded during the orbiting motion of the scrolls, and finally, discharges through passage 620 and discharge port 621 at the peripheral portion of the front fixed scroll. There are three substantially similar and uniformly distributed crankshafts (only one 630 is shown). The crankshafts serve three functions: driving, anti-rotation and axially compliant. The one or more crankshafts convert the orbiting motion of the orbiting scroll in to rotation and then drive a generator to produce electricity. The three crankshafts work together to prevent the orbiting scroll from rotation. The crankshafts also allow the orbiting scroll move axially, so called the axial compliance, to maintain the radial seal between the tips and bases of the scroll.

Referring to FIG. 6, the front and rear orbiting scrolls 602 and 603 have front end plate 631 and 632, respectively. There is a plenum chamber 633 formed between the two end plates. Sealing element 634 seals off plenum chamber 633 from surrounding low-pressure area. The plenum chamber 633 is connected to a selected position of expansion pocket formed between the fixed and orbiting scrolls through a passage 635. The forces of the steam acting on the area in the plenum chamber 633 slightly exceed the total axial forces acting on the opposite surface of the front orbiting scroll 602 by the expanding steam. The net axial forces will urge the front orbiting scrolls towards the front fixed scrolls to achieve very light contact between the tips and bases of the mating scrolls 601 and 602. This axial compliant mechanism enables a good radial sealing between expansion pockets and makes the wear between the orbiting and fixed scrolls negligible and self-compensating.

In the floating scroll, a crankshaft synchronizer 636 is used to keep the orientation of three crankshafts being synchronized. Therefore the orbiting scroll is capable to move in the radial direction and keep flank-flank contact of the spiral walls of the mating scrolls. This is so called radial compliance, which enables good tangential seal between expansion pockets formed between mating scrolls.

The axial and radial compliant mechanisms enable the orbiting scrolls dynamically being balanced, yet lightly contacting mating fixed scroll to achieve good and lasting seal for high efficiency and durability. We called it floating scroll technology.

FIG. 7 shows the steam to water exchanger(Co Generator Steam condenser) 10 for the embodiment of FIG. 1. The invention uses a plate fin exchanger to extract heat from the exhaust of the expander to heat water for co generation usages of domestic hot water, heating hot water and other incidental usages. The exchanger 10 can be small in size, but able to extract all of the co generated hot water that is available, and can be one manufactured by Alfa Laval model # TK 205411G01. The exchanger 10 allows for fluid flow on one side from expander drive 8 coming in at approximately 212 to approximately 230 F at approximately 60 psi and going out another end to heat dissipation coil 11 and eventually to return to heat generator(boiler) 3 The other side of the heat exchanger 10 has an opposite flow path with fluid flowing in from co-generation loop 13(from other loads) and out other end to co-generation recirculation pump 14 at a temperature of approximately 140 F.

Figure 8:
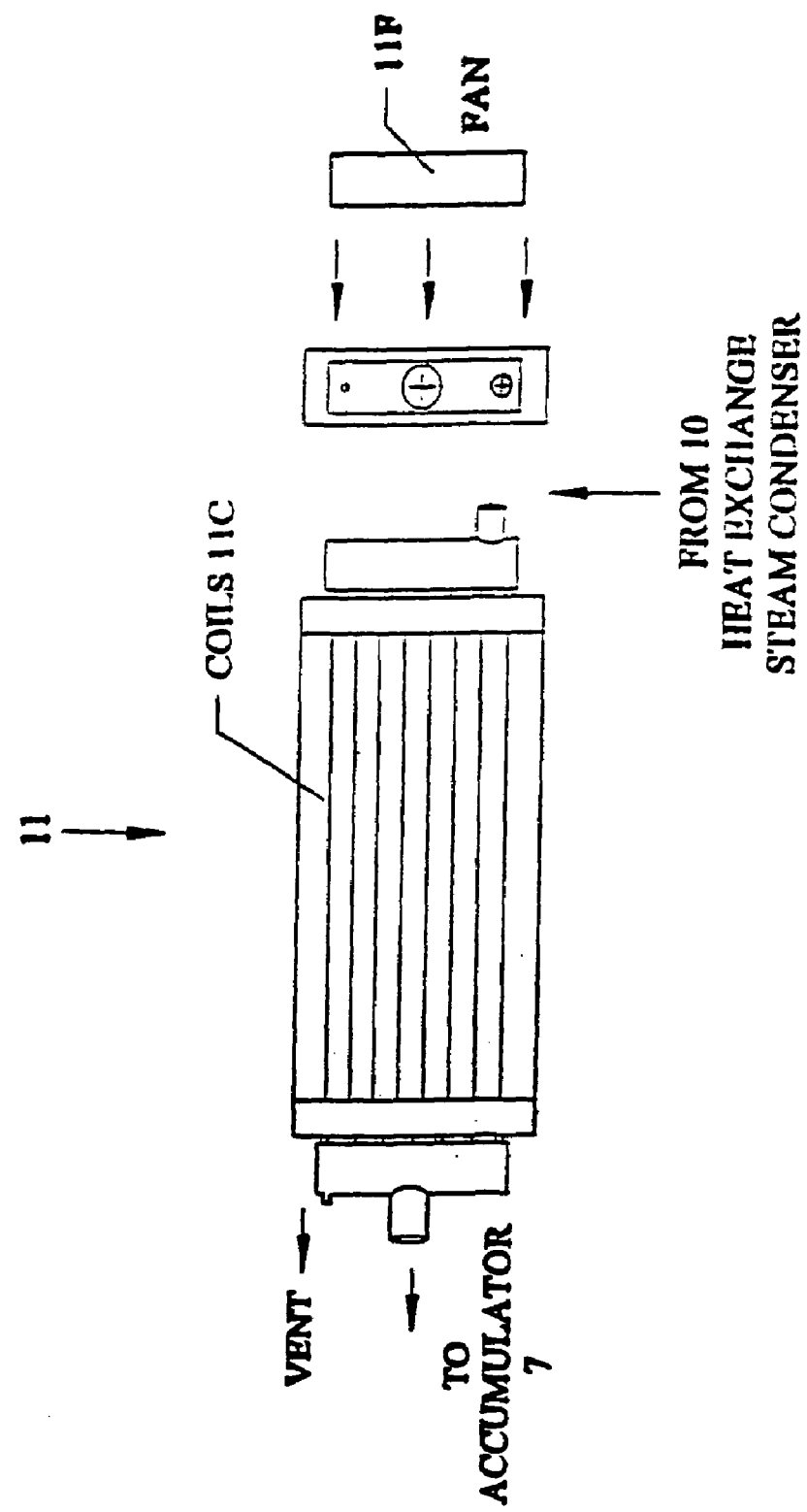
FIG. 8A shows the steam dissipation coil(heat dump steam condenser) for the embodiment of FIG. 1.
FIG. 8B is an end view of the coil and fan assembly of FIG. 8A.

FIG. 8A shows a side view of the steam dissipation coil(heat dissipation steam condenser) 11 for the embodiment of FIG. 1, and includes a coil and fan assembly FIG. 8B is an end view of the coil and fan assembly of FIG. 8A. The steam dissipation coil provides a method of condensing the steam from the expander 8 when all co generated heat has been satisfied. This allows the invention system to continue operating and providing electricity to the power grid 18 on a 24 hours a day seven days a week basis. The condensate coil 11 can be manufactured by Heatcraft or other fin and tube manufacturers, and is used for the closed loop system, and can be made of stainless steel tubes with aluminum fins. The coils 11C allows for dissipation of excess heat which cannot be utilized in the co-generation loop in FIG. 1.

The heat rejection fan assembly 11F used in the steam dissipation application can be a modulating speed motor blower assembly controlled from a heat level feed back from the steam dissipation coil. This can be an off-the-shelf fan device of 115 volt, ⅙ horsepower, 1725 RPM with a 16-inch propeller fan putting out 1600 CFM at maximum condition. Air flows from the fan 11F through the coils 11C that are about the flow path lines inside the coil assembly 11.

FIG. 9 shows the configuration of the condensate return pump(high pressure return pump) 5 for the embodiment of FIG. 1. Low pressure fluid coming from accumulator(water tank) 7 FIG. 1 passes into the metal bellow assembly by line 510. The adjustable eccentric drive expands and compresses the metal bellows 520 along double arrow E, producing a high pressure output supply of liquid which passes to check valve 6 out line 530 back to reclaimer 4 and then to heat generator(boiler) 3 FIG. 1 A fractional electric horsepower motor, M, 560 can be used to rotate an adjustable eccentric wheel drive 550 in the direction of arrow R which can be used to expand and compress the metal bellows pump 520 by a piston type connector 540.

This high pressure, low volume pump 5 can provide approximately 600 plus PSI condensate water back into the high pressure boiler supply 3. Bellows pump 5 allows for boiler input conditions greater than or equal to approximately 600 PSI greater than or equal to approximately 200 F, and a mass flow of 95 pounds per hour. Primary description provides seamless high pressure low volume pumping of condensate(steam turned back to water)in boiler supply circuit(5, 6, 4, 3 FIG. 1).

FIG. 10A shows a top view the air conditioner unit and system 19 for FIG. 1. The A/C module unit 19 can consist of variable speed compressor 710, condenser coil 720, refrigerant pump 730, expansion valve 740, evaporator coil 750, variable fan(blower) 760, and variable speed fan (blower) 780. This unit 19 can be a straight A/C unit, not a heat pump, as the heat required by the home will be taken from the cogeneration loop of the invention in FIG. 1.

The air conditioner unit/system 19 can be a high efficiency(approximately 20 SEER) rated to operate on the lowest amount of fuel source needed. The compressor can either be a straight electrically-driven compressor or mechanically driven from the expander drive 8, and can include:

1. Refrigerant tubes 790 in the condenser and evaporator can have rifled interior surfaces with added tube turbulators(see 790X).
2. Both condenser and evaporator can have variable fan controls to match the loads required by the usage.
3. The compressor can be an advanced scroll that can be modulated according to usage needs.
4. A liquid refrigerant pump(with Freon) and matched expansion valve can be used for greater system efficiency.
5. A quiet and energy-efficient condenser and evaporator fan blade can be used. This can be an off-the-shelf item such as one manufactured by Jet Fan using the Coanda effect.
6. A complete model line of approximately 2 ½ to approximately 5 tons can be available in single and three phase electric input.

The A/C module can have the highest SEER (Seasonal Energy Efficiency Ratio) rating and lowest cost and will be more reliable than any high-efficiency A/C units in the market today. The operation of the A/C unit and system 19 will now be described in reference to FIG. 10A.

Starting at heat absorbed from the interior environment by the evaporator coil 750. Air from the interior of a space can be blown over the rifled tube evaporator coil 750 by the variable speed blower(fan) 760. The refrigerant(Freon) in absorbing heat has been changed to gas. This low pressure gas continues to the air conditioning variable speed compressor 710. A suction accumulator(not shown) can be added to prevent liquid from entering the compressor 710. The compressor 710 intakes the low pressure heated gas to a high pressure heated gas adding the heat of compression. This heated refrigerant gas enters the novel rifled tube (detail 790X shown in FIG. 10B), which causes a turbulated effect inside tube 790 where ambient air(outside air) induced by the quiet blade fan of blower 780 cools the gas into a liquid. This liquid, under pressure from the compressor 710 is further increased in pressure by a liquid refrigerant(Freon) pump 730 to increase efficiency. This liquid then enters a thermal expansion valve 740, where it is expanded through an orifice into evaporator 750 removing heat from the interior environment of the space being cooled by A/C unit and system 19 to complete the cycle.

FIG. 11 shows a wiring diagram for various components for FIG. 1. Referring to FIGS. 1 and 11, the heat rejection fans used in the steam dissipation coil assembly 11 can be controlled by a modulating speed motor blower assembly controlled from a heat level feedback from the steam dissipation coil in the dissipation coil assembly 11. The assembly 11 can include a 115 volt, ⅙ horsepower, 1725 RPM with a 16 inch propeller fan putting out 1600 CFM at maximum condition.

The heat rejecter from the electric generator 9 in FIG. 1 can includes A fractional HP circulator of an antifreeze solution (TACO or Grundfos), 115 volts. A pancake blower of 50 CFM(EBM) or similar, 115 volts, with a heat sensitive speed controller(Honeywell) or similar, 115 volts.

Referring to FIGS. 1 and 11, the control module 17, can be an off-the-shelf product manufactured by Honeywell, Invensys, or Varidigm, and is controlled by a 115 volt input and puts out a 24 volt signal through a high limit and switch. This module also controls the gas ignition device, either a hot surface igniter or spark igniter of 115 volts. Through an internal or external relay it controls the modulating combustion blower and modulating gas valve. It also controls the high pressure condensate pump and the electric generator cooling circulating pump. This pump modulates according to a temperature signal of the circulating fluid. On separate 115 volt circuits, heat signal modulating fans control the co generation pump, the dump coil blower fan and the space heating fan in the air conditioning unit evaporator cabinet. The air conditioning unit 119 has its own modulation circuit as described in the air conditioning description previously described.

Figure 12:
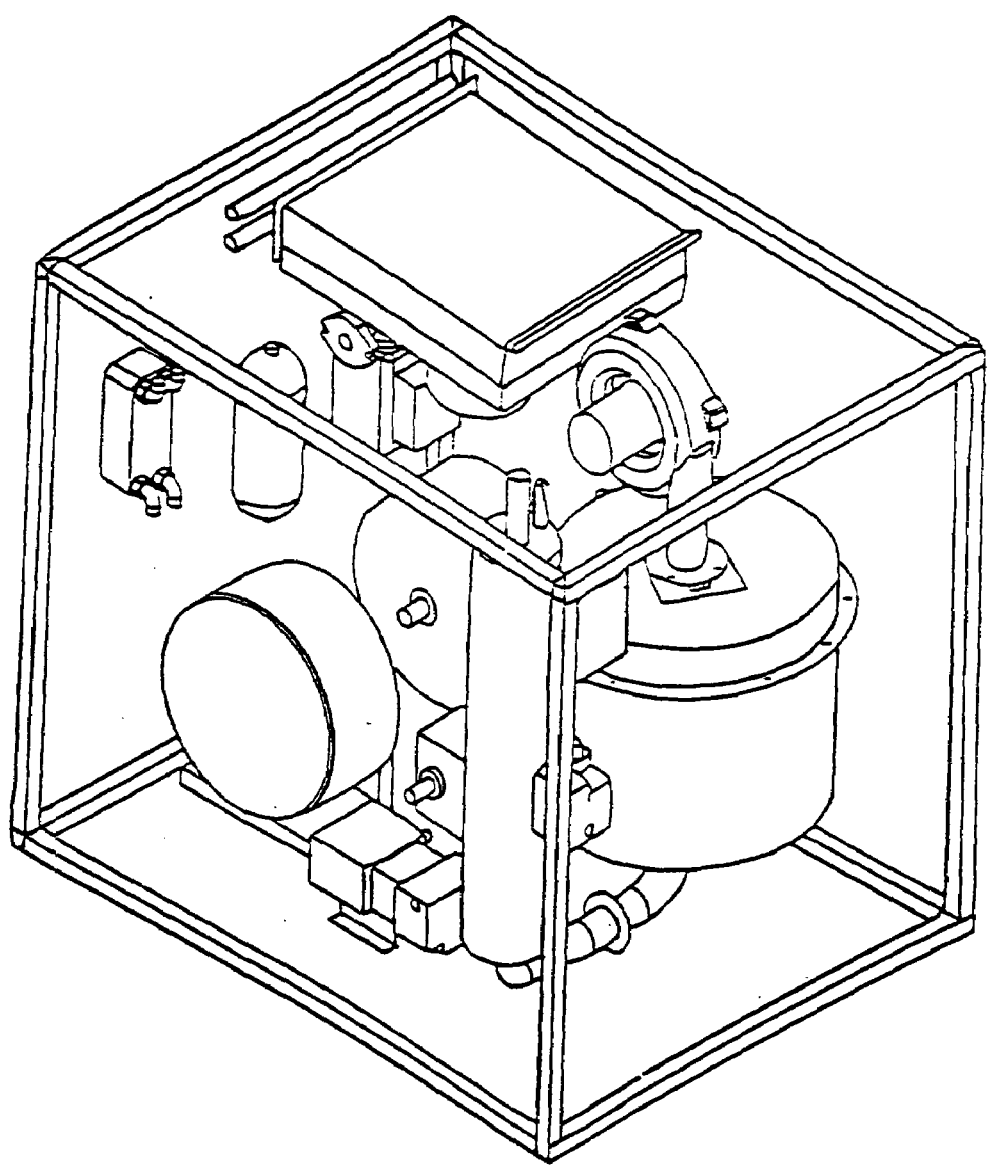
FIG. 12 shows a preferred layout of all the components of the invention in a 3' by 4' by 5' box for use by the end user of the invention.

FIG. 12 shows a perspective view of a preferred layout of all the components of the invention in an approximately 3' by approximately 4' by approximately 5' box for use by the end user of the invention.

Figure 13:
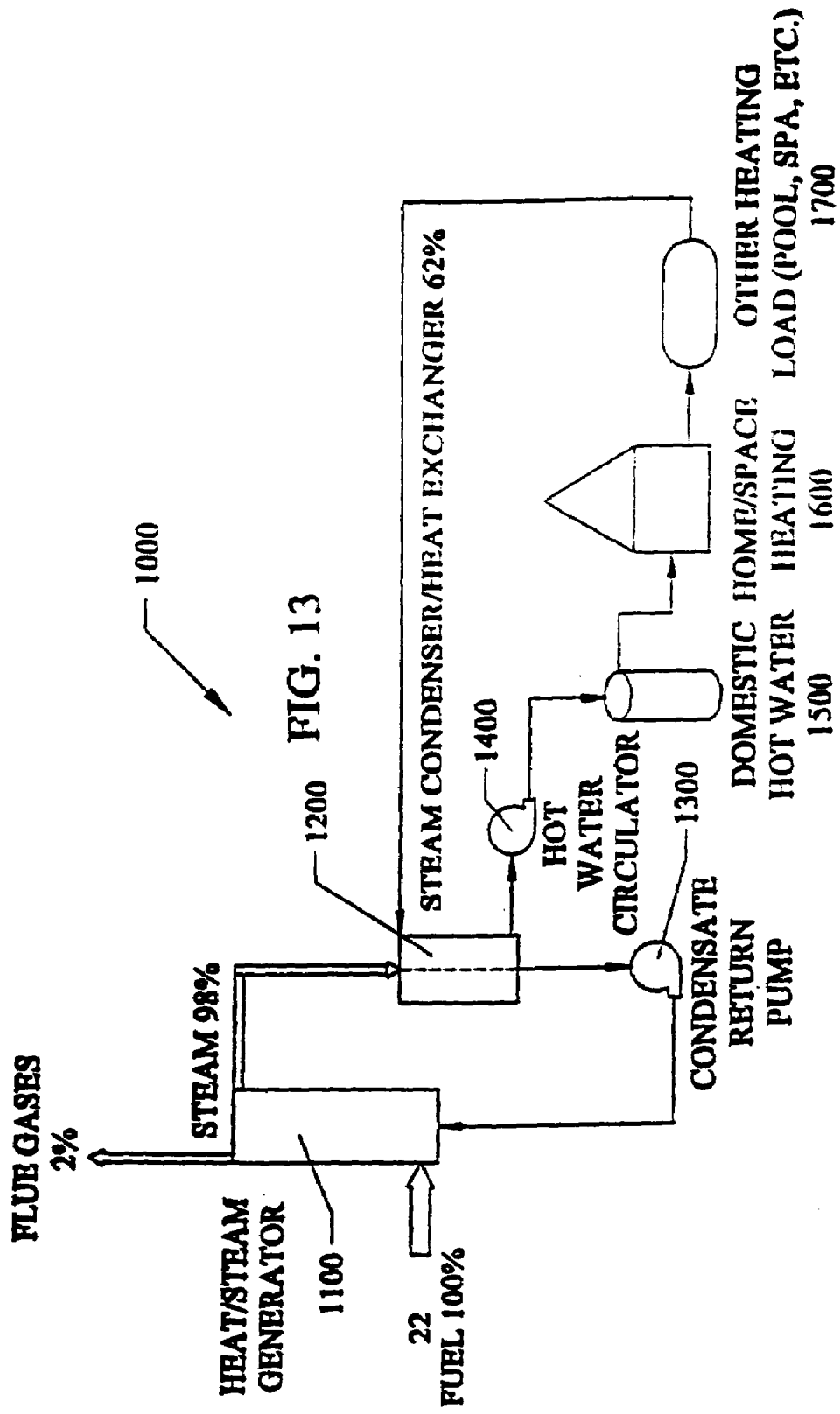
FIG. 13 shows a second preferred embodiment for heat generation using a closed loop steam generator system.

FIG. 13 shows a second preferred embodiment 1000 for heat generation using a closed loop steam generator system 1200, 1400, 1500, 1600, 1700. The steam generator(boiler 8) 1100 referenced above in FIGS. 2–3 turns water into steam by burning a fuel source (22 FIG. 1) such as natural gas, propane, and any vaporous fuel. Generated steam having a temperature of approximately 280 to approximately 1000 degrees, and a pressure range of approximately 100 to approximately 600 psi. The generated steam has an efficiency rating of turning water into steam of up to approximately 98%, with flue gases being up to the remaining approximately 2%. The steam enters a steam to water condenser exchanger 1200(10 FIG. 7) where the steam is changed back to water back into the heat(steam) generator by high pressure condensate return pump 1300 (5 FIG. 9).

Operation of novel closed loop heat cycle. From the condenser heat exchanger 1200 water passes to hot water circulator 1400(such as off-the-shelf water pump) to supply domestic hot water 1500(through a domestic hot water type heater) at temperature ranges of approximately 120 to approximately 140 F Additionally, the pump 1400 supplies the hot water to home and/or space heating 1600(such as but not limited to radiator, base board, radiant in-floor heating pipes, or forced air or hot water/forced air systems) at similar temperatures). Additionally, other heating loads 1700, such as but not limited to pool heating, spa heating, underground pipes for snow/ice removal, and the like. After which the water is returned to condenser heat exchanger 1200 at a lower temperature of approximately 20 to approximately 30 degrees lower than the outgoing heated water temperature passing through hot water circulator pump 1300.

Figure 17:
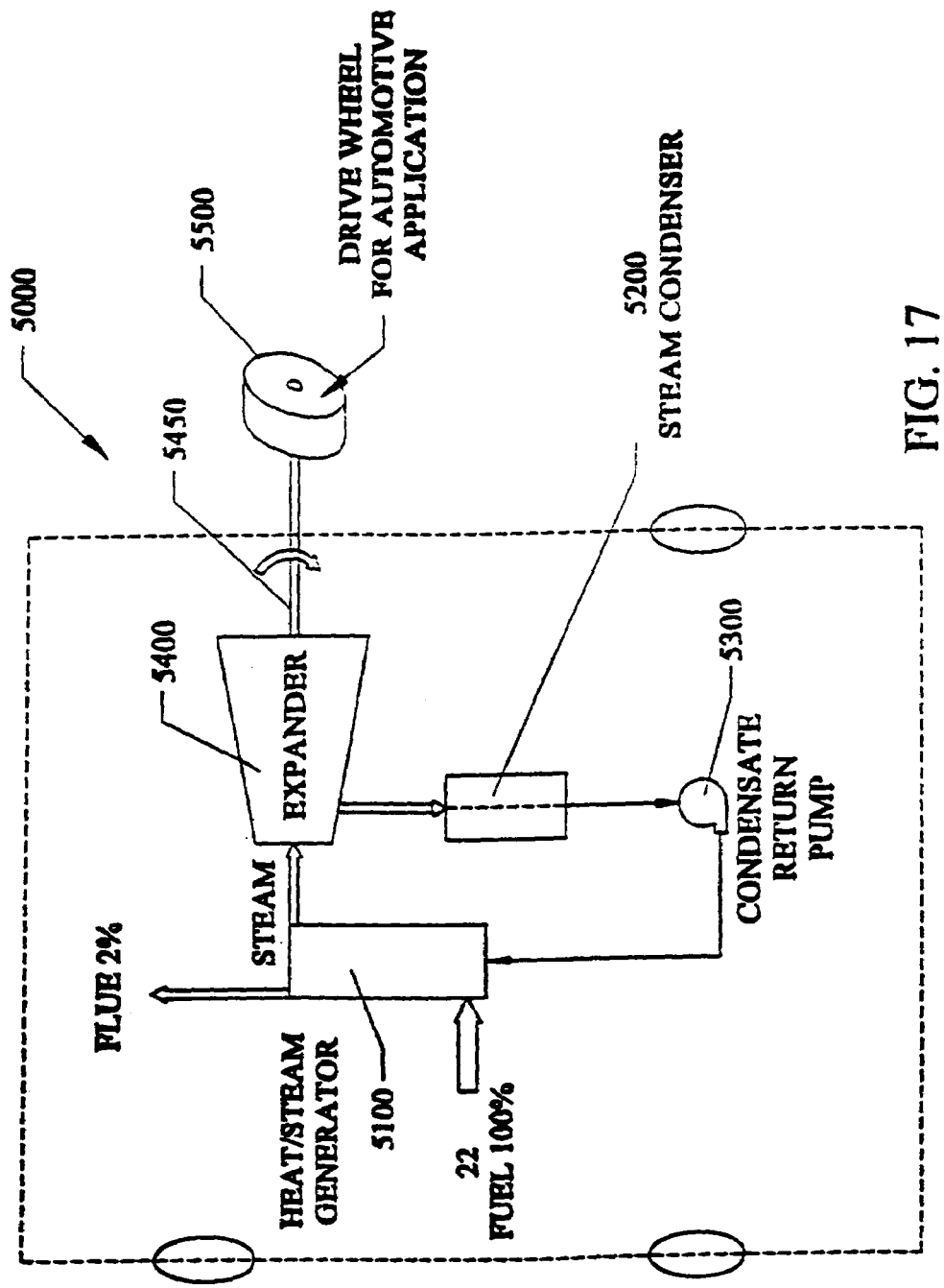
FIG. 17 shows a sixth preferred embodiment for powering a drive shaft driven vehicle using the novel steam generator, expander and steam condenser of the invention.

The preferred layout of FIG. 17 achieves up to an approximate 98 percent efficiency while standard safety codes (ASTME, American Society of Testing Material Engineers) has codes of up to the 70 to 80 percent ranges. Additionally, the layout can be sized to be fit into a space of less than 2 by 1 by 1 foot space.

The simplicity and reduced parts in the system of FIG. 17 is can continuously run 24 hours a day seven days per week up to approximately 50,000 hours or more before any maintenance is needed, and does not require any lubrication for the system.

Figure 14:
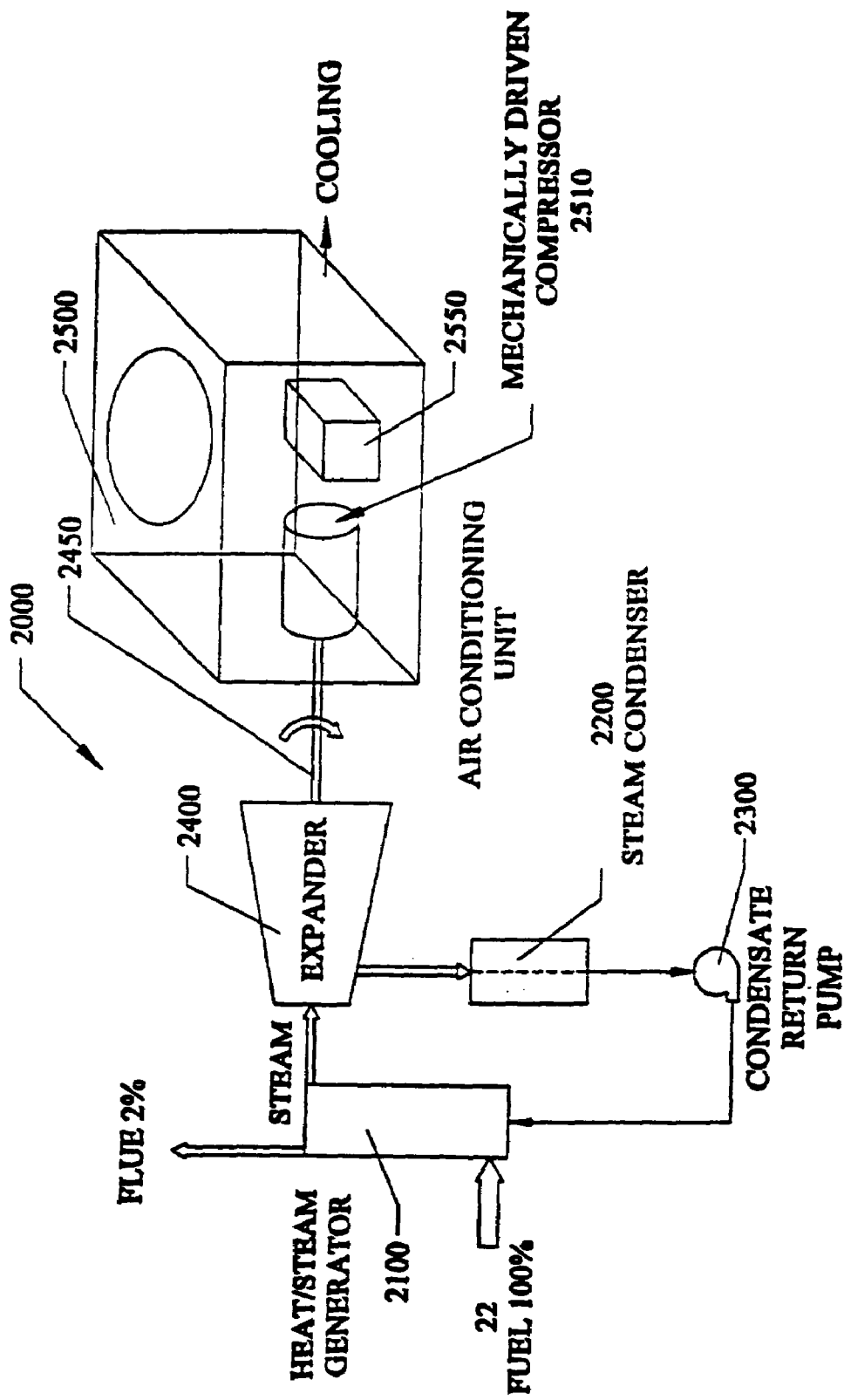
FIG. 14 shows a third preferred embodiment for powering a drive shaft driven air-conditioner unit using the novel steam generator, expander and steam condenser of the invention, which is a vaporous fuel supplied air conditioner

FIG. 14 shows a third preferred embodiment 2000 for powering an air-conditioner unit using the novel steam generator 2100, expander 2400(8 FIGS. 5A, 5B, 6) and steam condenser 2200 of the invention, which is a vaporous fuel supplied air conditioner. The steam generator 2100 referenced above in FIGS. 2A–2B turns water into steam by burning a fuel source such as natural gas, propane, and any vaporous fuel. Generated steam having a temperature of approximately 280 to approximately 1000 degrees, and a pressure range of approximately 100 to approximately 600 psi. The generated steam has an efficiency rating of turning water into steam of up to approximately 98%, with emitted flue gases being up to the remaining approximately 2%. The steam enters expander drive 2400(described above in reference to FIGS. 5A, 5B, and 6), which rotates output driveshaft 2450 which is mechanically connected to a direct drive compressor 2510 such as but not limited to a Copeland Inc. shaft driven compressor, a Tecumseh Inc. shaft driven compressor, and the like. The shaft driven compressor 2510 is connected to standard components in a standard airconditioning unit 2550(fan, condenser and motor for supplying cooled air), such as but not limited to those manufactured by Trane, York, Carrier, and the like. Compressor 2510 and airconditioner unit 2550 can be held in a single housing 2500.

Steam exiting the Expander drive 2400 passes to a steam to water/air condenser exchanger 2200(10 FIG. 7) where the steam is changed back to water back into the heat(steam) generator 2100 (boiler 8 FIGS. 2A, 2B) by high pressure condensate return pump 2300 (5 FIG. 9).

The preferred layout 2000 of FIG. 18 achieves up to an approximate 98 percent efficiency of the combined expander, steam condenser and steam generator, and these components can fit into a space of less than 3 by 1 by 1 foot space. The simplicity and reduced parts in the system of FIG. 18 is can continuously run 24 hours a day seven days per week up to approximately 50,000 hours or more before any maintenance is needed, and does not require any lubrication for the system.

Figure 15:
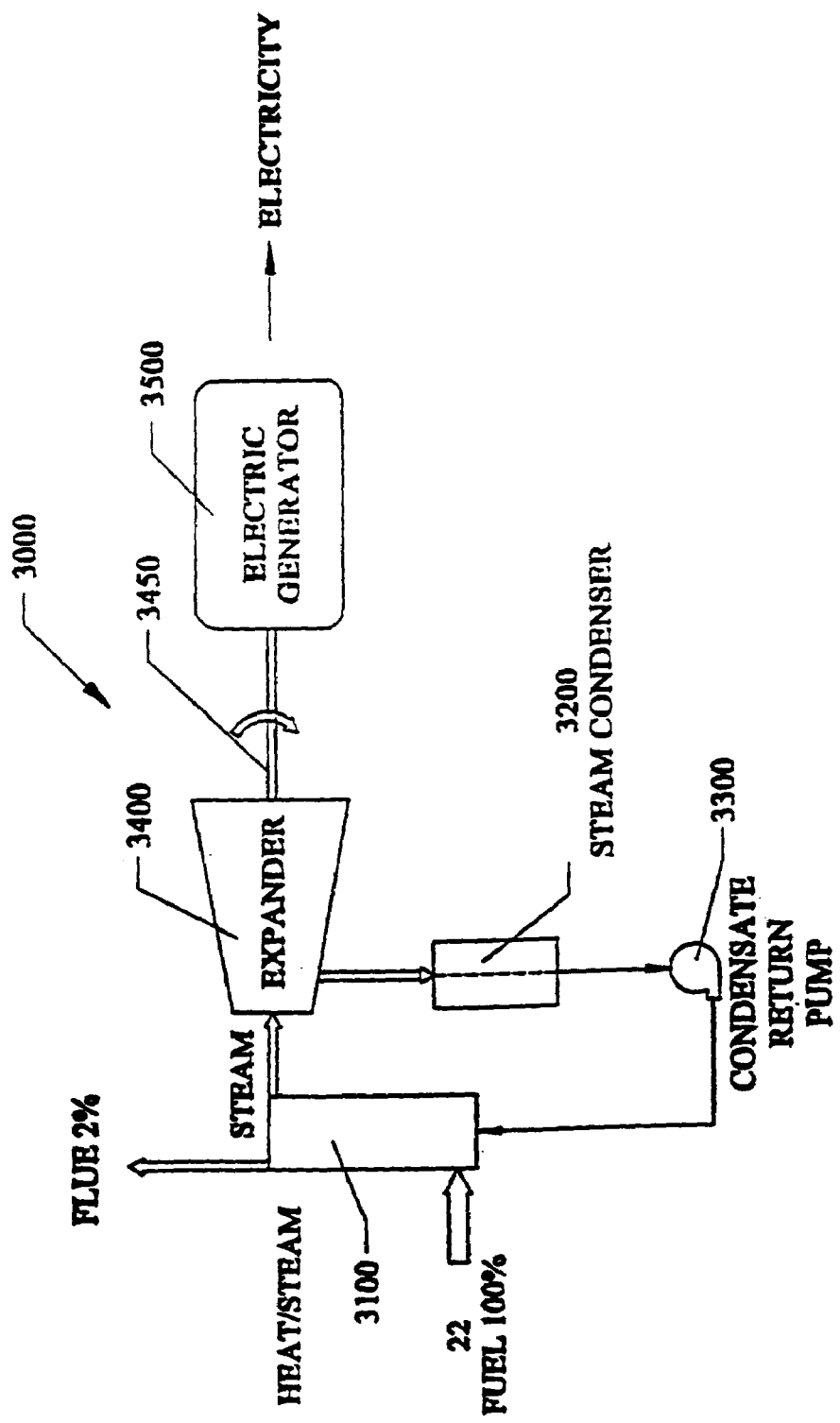
FIG. 15 shows a fourth preferred embodiment for supplying electricity to any electrically powered device or system using the novel steam generator, expander and steam condenser of the invention.

FIG. 15 shows a fourth preferred embodiment 3000 for supplying electricity to any electrically powered device or system using the novel steam generator 3100(boiler 8 FIGS. 2A, 2B), expander drive 3400(8 FIGS. 5A, 5B and 6) and steam condenser 3200 of the invention. The steam generator 3100 referenced above in FIGS. 2A–2B turns water into steam by burning a fuel source 22 such as natural gas, propane, and any vaporous fuel. Generated steam having a temperature of approximately 280 to approximately 1000 degrees, and a pressure range of approximately 100 to approximately 600 psi. The generated steam has an efficiency rating of turning water into steam of up to approximately 98%, with emitted flue gases being up to the remaining approximately 2%. The steam enters expander drive 3400(described above in reference to FIGS. 5A, 5B and 6)), which rotates output driveshaft 3450 which is mechanically connected to an shaft driven electrical generator 3500 such as but not limited to SmartGen 70-32W Generator by Light Engineering Inc., Marathon Generator, e-Cycle Generator, and the like.

Steam exiting the Expander drive 3400 passes to a steam to water/air condenser exchanger 3200(10 FIG. 7) where the steam is changed back to water back into the heat(steam) generator 3100 by high pressure condensate return pump 3300 (5 FIG. 9).

The preferred layout of FIG. 19 achieves up to an approximate 98 percent efficiency of the combined expander, steam condenser and steam generator, and these components can fit into a space of less than 3 by 1 by 1 foot space.

The simplicity and reduced parts in the system of FIG. 19 can continuously run 24 hours a day seven days per week up to approximately 50,000 hours or more before any maintenance is needed, and does not require any lubrication for the system.

Figure 16:
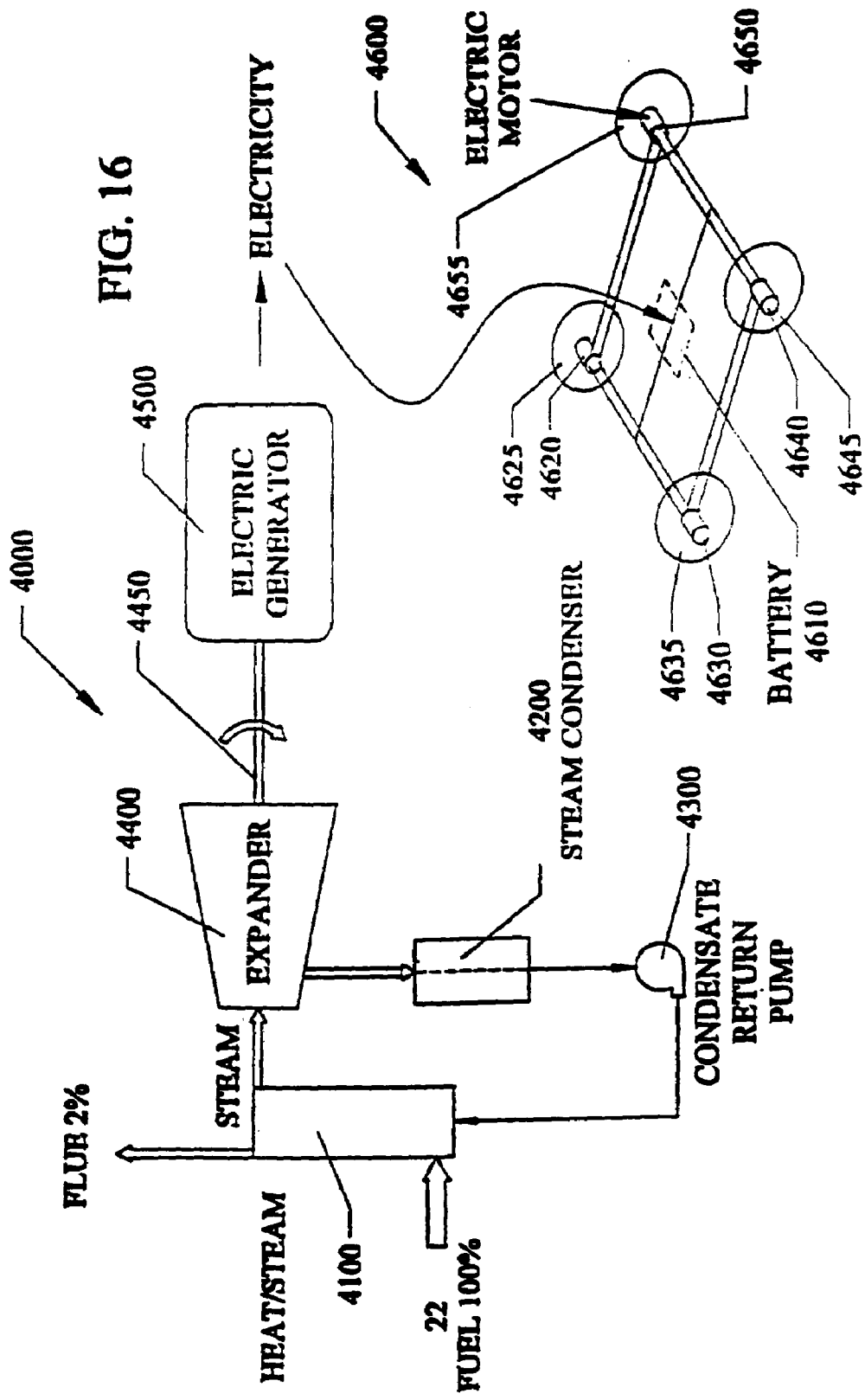
FIG. 16 shows a fifth preferred embodiment for supplying electrical power to an electric vehicle, such as an electric car using the novel steam generator, expander and steam condenser of the invention.

FIG. 16 shows a fifth preferred embodiment 4000 for supplying electrical power to an electric vehicle 4600, such as an electric car using the novel steam generator, expander and steam condenser of the invention. The steam generator 4100 referenced above in FIGS. 2A–2B turns water into steam by burning a fuel source 22 such as natural gas, propane, and any vaporous fuel. Generated steam having a temperature of approximately 280 to approximately 1000 degrees, and a pressure range of approximately 100 to approximately 600 psi. The generated steam has an efficiency rating of turning water into steam of up to approximately 98%, with emitted flue gases being up to the remaining approximately 2%. The steam enters expander drive 4400(described above in reference to FIGS. 5A, 5B and 6), which rotates output driveshaft 4450which is mechanically connected to an shaft driven electrical generator 4500 such as but not limited to SmartGen 70-32W Generator by Light Engineering Inc., Marathon Generator, e-Cycle Generator, and the like.

The electric generator 4500 can supply electricity to a vehicle battery 4610 which can be connected to electric motors 4620, 4630, 4640, 4650 that rotate axles about wheels 4625, 4635, 4645, 4655 of a vehicle 4600 such as a car, and the like.

Steam exiting the Expander driver 4400 passes to a steam to water/air condenser exchanger 4200(10 FIG. 7) where the steam is changed back to water back into the heat(steam) generator by high pressure condensate return pump 4300 (5 FIG. 9).

The preferred layout 4000 of FIG. 20 achieves up to an approximate 98 percent efficiency of the combined expander, steam condenser and steam generator, and these components can fit into a space of less than approximately 3 by approximately 1 by approximately 1 foot space The simplicity and reduced parts in the system of FIG. 21 can continuously run 24 hours a day seven days per week up to approximately 50,000 hours or more before any maintenance is needed, and does not require any lubrication for the system.

FIG. 17 shows a sixth preferred embodiment 5400 for powering a drive shaft driven vehicle using the novel steam generator 5100, expander driver 5400 and steam condenser 5200 of the invention. The steam generator 5100 referenced above in FIGS. 2A–2B turns water into steam by burning a fuel source 22 such as natural gas, propane, and any vaporous fuel. Generated steam having a temperature of approximately 280 to approximately 1000 degrees, and a pressure range of approximately 100 to approximately 600 psi. The generated steam has an efficiency rating of turning water into steam of up to approximately 98%, with emitted flue gases being up to the remaining approximately 2%. The steam enters expander driver 5400(described above in reference to FIGS. 5A, 5B and 6), which rotates output driveshaft 5450which is mechanically connected to a drivetrain/axle or which rotates an axle to a wheel(s) 5500 on a vehicle 5000 such as a car, and the like.

Steam exiting the Expander driver 5200 passes to a steam to water/air condenser exchanger 5200 (5 FIG. 7) where the steam is changed back to water back into the heat(steam) generator 5100 by high pressure condensate return pump 5300 (7 FIG. 9).

The preferred layout 5000 of FIG. 21 achieves up to an approximate 98 percent efficiency of the combined expander, steam condenser and steam generator, and these components can fit into a space of less than 3 by 1 by 1 foot space.

The simplicity and reduced parts in the system of FIG. 21 is can continuously run 24 hours a day seven days per week up to approximately 50,000 hours or more before any maintenance is needed, and does not require any lubrication for the system.

The invention can also use other heat recovery techniques and methods to maximize energy efficiency. For example, Thermal Photo Voltaic (TPV) devices can also be used with the invention to enhance energy efficiency. The TPV's generate electrical power from heat. TPVs can be installed on the exterior surface of an appropriate temperate surface of devices such as the system pumps, blowers(fans), and the like, and the electrical power generated ($\approx 5W/cm^2$) will help satisfy parasitic electrical losses in the invention further increasing efficiency.

Although the invention as been described using a scroll expander drive as the prime mover, other devices such as reciprocating pistons, Wankle-type engines, turbines, and the like can also be utilized to make the invention work.

Supertropic Power Production Embodiments

As previously mentioned in the background section of this invention, steam engine techniques such as those described in patents by James Watts do not solve all the problems of the wasteful energy conversion methods and systems currently being used.

If we now consider isentropic expansion under the above mentioned conditions of Watt's experiments, we get Full load work and Isentropic expansion work as:
1. Full load work over the first stroke-meter: approximately 75 kps/approximately 1.7 m3/kg=approximately 44 kJ/kg
2. Isentropic expansion work over the remaining 3 stroke-meters: (as per steam properties): 225 kJ/kg, ,where kps" refers to Kilograms per second; m3/kg" refers to Kilograms per cubic meter, and kj/kg" refers to Kilograms per Kilojoule.

Thus in total: 44 kJ/kg+225 kJ/kg=269 kJ/kg, which is 269/128=2.1 times more than without expansion.

As described in the background section of this invention, Watt measured a work factor of approximately 2.4, which thus clearly indicates supertropic expansion!

In addition, it is important to mind that the above calculation is an ideal one(math only computation), whereas Watt's measured values were practical ones(Actual test data of materials and imperfections in manufacture), thus showing less than the ideal values for supertropic expansion.

The work done well over 200 years ago in Watt's time was never recognized, because the properties of steam and the physics of thermodynamics were not known to the present extent, non-condensing steam engines soon took over from Watt's atmospheric engine and Watt's experiments were not recalled by later researchers developing steam tables, ph-diagrams, etc. Also, the estimated gain(supertropic expansion) was not realized in Watt's days. Losses by friction, by conduction and radiation of heat and by condensation on the cylinder walls and re-evaporation thereof in the cylinder, of which losses the latter are most serious.

To achieve supertropic expansion in a displacement system and by virtue of the properties of ammonia, (being a preferred medium), a low pressure sink below atmosphere is needed. As ammonia is very strongly absorbed by water, such low pressures can easily be obtained by connecting the expander exhaust to a water-containing vessel.

In view of the above it is clear though that high demands are placed on the sealing properties of the expander, as we are looking at pressure ratios in the size of order of approximately 1:25(one part expands to twenty five), possibly higher. It can only be done with the high level of manufacturing technology existing today, to achieve high rotational speeds, that minimize the effects of leakage.

With this concept it would be possible to build smaller machines in the range of tenths to hundreds of kilowatts, converting heat of any external source into electrical power. As ammonia is a gas at atmospheric conditions, it can be made to evaporate by absorbing ambient heat, or any low quality heat, such as for the purpose of waste heat recovery. Thus, the obtained saturated vapor can be superheated with a high-quality heat source and the total of energies is than converted into mechanical energy.

Depending on the mechanical and specific volumetric properties of an expander, efficiencies close to ideal, or even over Carnot, can thus be achieved. Carnot would be efficiency defined as the difference of the entering hot temperature minus the leaving cold temperature divided by the entering hot temperature in Rankine degrees relating to absolute temperature.

A prime condition for a gas to deliver mechanical energy is a change in volume. If the volume remains constant (isochore process), only temperature and pressure can change, but no work is done on the boundaries of the system. In thermodynamics three other basic modes of change of condition of a gas are considered, which are illustrated in the TS-diagram (temperature-entropy) shown in FIG. 19A. Different modes are shown for expansion of a trapped gas from volume V1 to V2. The pressure of the environment (atmospheric) is P2. In FIG. 19A Temperature is on the vertical axis and entropy is on horizontal axis, and units can be arbitrary and be any measure of temperature and any unity of entropy. A description of FIG. 19A is listed below.

1) Isotherm A–B: During the expansive change of volume, work is done on the boundaries of the system, which at any moment in time is the same amount of heat energy being applied. Thus the internal energy remains constant and so does the temperature. The amount of applied (heat) energy is represented by the rectangular area A-B-S3-S1

2) Isentropic A–D (called "adiabatic" in the PV-diagram): During the expansive change of volume, work is done on the boundaries of the system, but no heat is exchanged with the environment. This means that all the work will be taken from the internal energy of the gas. As a result, temperature and pressure go down. The entropy remains unchanged, from which the name "isentropic". The according amount of energy is the area under the V2-curve D-B-S3-S1. If T1 is at ambient temperature, this amount of energy will be absorbed as latent heat from the environment, by which the system's condition changes to D, to restore its original internal energy. This is why an air motor gets cold.

3) Polytropic A–C: If during the expansion an amount of heat (less than the isotherm amount) is applied, the internal energy will not decrease as much as in the isentrope case, because part of the work done comes from this applied heat. This heat is represented by the area A-C-S2-S1. The total work is represented by the sum of that area and the area C-B-S3-S2 (latent heat). Polytropically shifted change of condition is the practical case in all applications. This is why a compressor gets hot.

If during expansion heat would be cooled off instead, and because the end volume of expansion, V2, remains unchanged, the end of expansion will then be on a lower temperature, T3 (less internal energy) and lower pressure P3, which is below the counter pressure P2. Hence, in the end part of expansion, the environment (P2) will do (negative) work on the system boundaries instead and so the total work done by the system will decrease, with the amount of cooled-off heat, represented by the area A-S1-So-E.

However, instead of cooling off heat during expansion, the same change of condition can be achieved by lowering the counter pressure on the working boundaries (below P3—not shown), thus increasing the working force over these boundaries and thus increasing the work that the system does on them. If the end condition of the expanded gas is the same as would have been by cooling off a certain amount of heat, then the according amount of heat energy must have appeared as mechanical work, represented by the area A-S1-So-E. The total mechanical work done by the system then is the sum of this and the isentropic work D-B-S3-S1.

FIG. 19B shows a pressure versus Enthalpy graph for the invention. Referring to FIG. 19B, state point (1) is the ammonia vapor that comes out of the desorber (approximately 100 CE at approximately 5 bar), superheated already, and is then further superheated to state point (2) to approximately 300 CE and approximately 2200 kJ, where it enters the expander. In the expander the vapor expands supertropically to state point (3) at approximately −61 CE. The lines of constant volumity are directly related to the maximum and minimum volumes of the expander's displacement. The expansion likely will not follow the straight line between state points (2) and (3), but whatever other path it will follow in practice is totally indifferent, as long as the expansion ends in state point (3).

If the lowest, end-expansion pressure in the expander is not the same as the counter pressure from the absorber, it naturally will be higher and then the expansion will end somewhere on the lower volumity line (v=2.0) at the right of state point (3). It cannot be anywhere else, because the expander is a displacement machine and thus the end volumity is given per design. The further the end state point of expansion shifts to the right, the lower the expander shaft output will be, but there is still a LONG way to go until it would reach the intersection for isentropic expansion (3a), as shown above.

In state point (3) we see that the volumity line intersects the horizontal for approximately 0.2 bar at x=0.4, meaning that approximately 40% of the mass is in gaseous condition and hence, approximately 60% in liquid. The enthalpy of the liquid shows in state point (4), approximately −80 kJ/kg, and that of the vapor in state point (5) approximately 1375 kJ/kg. Mind that the enthalpies in the diagram above are per kilogram of mass, so the actual enthalpies must be corrected for the respective masses (approximately 550 kJ for vapor and approximately −50 kJ for liquid). The vapor at state point (5) enters the absorber.

The liquid in state point (4) is in the receiver, from where it is pumped to the heat exchanger in the absorber, bringing it to the desorber pressure of approximately 5 bar-state point (6). The pump energy, small as it is, is neglected here (ideal case). With this pressure it enters the heat exchanger in the absorber, where it is heated to state point (7). We see that x~approximately 0.51 there, so around half of the liquid has evaporated already and the whole mixture is saturated at around approximately 6 CE. Some superheat will occur and gives the lowest temperature of the regenerator at approximately 10 CE and thus is the temperature of now weak solution, injected in the absorber. It is driven by the pressure difference between desorber and absorber and a flow-regulating device will be needed to adjust the mass flow. In the regenerator the liquid evaporates further and the resulting vapor superheats to finally reach state point (1) at 100 CE, where it joins the vapor coming out from the desorber and the cycle is closed.

If the expanding gas is a saturated vapor, it will then becomes wetter (condense more) during supertropic expansion, to deliver the extra work. Water vapor (steam) is not very suitable for this, because its vaporization enthalpy is very high and so not much of its mass will condense. Ammonia vapor has about half of the enthalpy of steam and one could achieve a much more favorable mass ratio between saturated liquid and vapor (60 mass % liquid is possible to achieve). The resultant energy then would appear as torque on the shaft of the positive displacement device, (expander). A preferred goal is to have the end state of supertropic expansion reach as far as possible in the wet area of the ph-diagram.

In achieving this goal, the expander must be tolerant to any combination of vapor and liquid. Expanders such as scroll or rotary vane and the like, are saturated vapor tolerant, including any combination of liquid part and vapor part ratios from 100% liquid to 100% vapor. By the virtue of their inherent design, pockets are formed as the center of the scrolls, which fill with inlet gas. Further orbital motion of the scroll closes the filled pockets and isolates them from the inlet flow. As orbital motion proceeds, the filled pockets expand in size—producing shaft work—while gas temperature and pressure decrease. Finally, the expanding pockets are opened to the exhaust manifold. During this entire process, condensation of the vapor will occur. The resulting liquid droplets do not pose a problem because they are confined by pocket walls, which are continuously expanding. Any vapor or liquid in the exhaust can never migrate back to the inlet—as might occur in a reciprocating engine. As vapor flows into the scroll inlet it is trapped and expanded in separate, isolated, and discrete packets that remain isolated from the inlet and exhaust manifolds. See for example, previously referenced U.S. patent application Ser. No. 10/342,954 filed Jan. 14. 2003, now U.S. Pat. No. 6,758,659 by one of the co-inventors of the subject invention. Rotary vane expanders accommodate liquids in much the same way as scrolls. In FIG. 20, a preferred approach is shown. This is not the only way the final machine can be built, but the functions of its details are as shown here.

FIG. 20 is a schematic showing the configuration for a supertropic power system 6000. The main function of absorber 6600 is to achieve a low pressure discharge (exit) condition for the expander 6400. This low pressure discharge of approximately 0.2 bar is used to achieve supertropic expansion in the liquid/vapor expander 6400. The liquid/vapor expander must be a positive displacement type, with a fixed expansion ratio, which is capable of handling both liquids and vapors that occur as the result of the low-pressure supertropic expansion.

Similar to the preceding embodiments, the liquid/vapor expansion device can be a rotary vane machine, scroll expander, or an arrangement with reciprocating pistons, and the like. The individual components of FIG. 20 will now be described.

Heat supply 6100, which can be an Alfa Laval or RSI thermal generator, can burn a gaseous fuel or use any number of alternative fuels or heat sources including waste heat.

Superheater 6200, which can be a RSI or Alfa Laval heater, uses the heat input provided by the heat supply to heat gaseous ammonia, as received from the desorber 6300 and the evaporator 6800, to the expander inlet conditions of approximately 600° F.

Desorber 6300, which can be an Alfa Laval Desorber, is used to separate ammonia vapor from the strong ammonia-water solution received from the absorber 6600. This separation is accomplished by heating ammonia-water solution using low temperature waste heat received from the superheater 6200. The separated ammonia vapor is supplied from the desorber 6300 to the superheater for reheating. The separated weak, warm ammonia water solution, as discharged from the desorber, is circulated to the regenerator 6700/6800 for heating and vaporization of the liquid ammonia received from the receiver 6900

Regenerator 6700/6800 is a 2-circuit heat exchanger having cooler 6700 and vaporizer 6800 circuits. The weak, warm ammonia-water solution as discharged from the desorber, is passed through the cooler where the heat extracted is transferred to the vaporizer 6800 where it is used to vaporize the ammonia liquid received from the receiver tank 6900 via pump 6950. The ammonia is vaporized, in the vaporizer, a pressure that is sufficient for it to join the vapor stock feed discharged from the desorber 6300 and is supplied to the superheater where it is reheated for reuse. In this manner, the heat of the chemosorption process (which is exothermic) that occurs in the absorber is largely recovered. The cooled weak ammonia-water solution discharged from the cooler 6700 is then supplied to the absorber 6600 for reuse in the ammonia-water chemosorption process performed in the absorber.

Receiver 6900, which can be a stainless Steel tank that-collects and separates the ammonia vapor from the ammonia liquid contained in the expander outlet (exhaust). The vapor separated in the receiver 6900 is routed to the absorber 6600. The liquid separated in the receiver is routed to the regenerator via the liquid pump 6950.

Absorber 6600, which can be an Alfa Laval absorber, employs ammonia-water chemosorption to provide the low pressure discharge source needed in the expander to achieve supertropic expansion. To achieve this objective, the cooled weak ammonia-water solution from the regenerator 6700/6800 is supplied to the absorber (the low pressure generated in the absorber by chemosorption is sufficient to draw it in), and is used in the absorber to absorb the ammonia vapor received from the expander via the receiver 6900.

Pump 6650 is used to transfer the enriched ammonia-water solution (now a strong aqua ammonia), which is collected in the bottom of the absorber 6600 into the desorber 6300. The flow-through of the recycling pump 6650 is controlled in order to assure that the temperature in the absorber 6600 does not exceed the evaporation temperature for the water in the absorber (approximately 60° C. at approximately 200 mbar), which is also dependent on the cooling capacity of the liquid ammonia. Pump 6500 is used to transfer liquid ammonia collected in the receiver 6900 to the vaporizer 6800 contained in the regenerator 6700/6800.

Exhaust 6350 from the desorber 6300 is discharged to the atmosphere or subsequently supplied to a co-generation heat exchanger.

Shaft 6450 connects the output shaft of the expander 6400 to an alternator 6500. The alternator 6500 can supply electrical power to various embodiments such as those described in the previous invention embodiments, such as being used to provide power to electrical grids, for supplying all electrical energy, cooling and heat needs of a single residential house, commercial business or office building, as well as to a vehicle such as a car, and the like.

In FIG. 21, the desorber 6300 can contain saturated aqua ammonia and is heated to release superheated ammonia vapor at a pressure that is controlled per design of the expander 6400. The temperature in the desorber 6300 should be well below that of evaporation of water, to minimize water evaporation. Any water vapor that follows with the ammonia gas, will deliver some work in the expander 6400.

As long as it doesn't interfere with supertropic condensation of the ammonia, no harm is done; otherwise an additional separating device can be used. An additional separating device can include but is not limited to an additional heat exchanger, which used for converting combustion gasses to ammonia gas.

The vapor is superheated in the superheater (to increase the thermal efficiency of the applied heat and the total power output) and then enters the expander 6400 to drive it. The expander 6400 will discharge a mixture of liquid ammonia and ammonia vapor at very low temperatures (around approximately 50 Celsius), that first will be collected in the receiver 6900, which is connected to the absorber 6600. The discharged vapor is then fed from the receiver 6900 to the absorber 6600, which by absorbtion of the vapor creates a low pressure sink of approximately 200 mbar, which is "seen" by the expander 6400 discharge. This corresponds with 60 Celsius for saturated water and so the injected water at the top of the absorber 6600 should be well below that temperature, as it will be heated by the exothermic absorbtion process.

To achieve this, the cold ammonia liquid in the receiver 6900, containing a lot of latent energy, could be pumped through a heat exchanger, the cooler 6700 and the evaporator 6800 located in the regenerator 6700/6800, in order to cool warm and ammonia-poor water from the desorber 6300, prior to it being sprayed into the absorber 6600 (the lower pressure there will draw it in). In this process, the liquid ammonia received from the receiver 6900 evaporates at a high enough pressure to join the feed vapor from the desorber 6300 and so it enters the superheater and begins the cycle again. In this manner the absorbtion heat generated in the absorber is largely recovered (the remaining heat energy is contained in the enriched, warmed-up water located in the bottom of the absorber and will be pumped into the desorber 6300, providing approximately 100% heat recovery, unless the absorber 6600 needs additional cooling to ambient.

The enriched water (an ammonia rich aqua ammonia solution), collected in the bottom of the absorber 6600 is pumped by pump 6650 into the desorber 6300 and the cycle is closed. The flow-through of the recycling pump 6650 is sufficient to assure, that the temperature in the absorber 6600 does not exceed the evaporation level for the water there (approximately 60 C at approximately 200 mbar), which is also dependent on the cooling capacity of the liquid ammonia. A control device, such as but not limited to a simple float switch in the absorber is used to control off the pumping rate of pump 6950. This assures that the amount of water provided to the absorber, matched to the flow-through rate of the recycle pump.

A chemosorption process is characterized by equilibrium between absorption and desorption. Pressure and temperature decide in what direction the process will go, resulting in different concentrations. If temperature and pressure would be the same for absorption and desorption, the concentrations would be the same in both.

Absorption refers to a physical bond and chemosorption to a chemical bond. Both types of bonding are associated with the generation of heat (absorbtion heat). Absorption is an exothermic reaction (it gives off heat) and desorption is an endothermic one (it takes up heat). By chemosorption, ammonia gas reacts with water by forming positive ammonium ions (NH4') and negative hydroxide ions (OH⁻) as follows in equation.

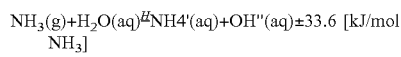

$NH_3(g) + H_2O(aq) \leftrightarrows NH_4'(aq) + OH''(aq) \pm 33.6$ [kJ/mol $NH_3$]

The suffix (g) stands for gaseous condition and (aq) for aqueous solution.

The total absorption heat for approximately 1 kg of ammonia is approximately 2180 kJ. This amount of energy must be the same for absorption and desorption, because it follows from the First Law of Thermodynamics, where Energy can not be created nor destroyed, as is known by those familiar with basic thermodynamics saying that if a system is brought into one condition, by adding energy to it, the same amount of energy must be released by bringing it back into the original condition. If there would be a difference, energy would be created from nothing, or disappear into nothing.

FIG. 21 is a schematic showing the configuration for a supertropic power system 7000 that utilizes an additional "absorber heat exchanger", which is positioned within the absorber 6600 (as shown), and provides the means for cooling the chemosorption process and recovering the heat produced as a result of the chemosorption process which occurs in the absorber 6600. The heat energy recovered by the heat exchanger is used as an additional heating source for heating of the liquid received from the receiver prior to delivery of the heated liquid to the regenerator. In this configuration the liquid ammonia collected in the receiver 6900 is transferred to the absorber heat exchanger via transfer pump 6950 before being delivered to the vaporizer 6800 located in the regenerator 6700/6800. By adding the absorber heat exchanger to the absorber 6600, the overall configuration, functions and components shown in FIG. 21 are otherwise identical to the system shown in FIG. 20.

Referring to FIG. 21, air enters combustion blower mixed with a gaseous fuel to a combustion burner. The combustion products 6100 heat ammonia in the finned tubes of the superheater section 6200. The ammonia is heated to approximately 300 C at 5 bar. Q3 (approximately 5000 KJ). This heated; pressurized ammonia liquid (approximately 5 bar, approximately 300 C, volume, approximately 58M3/kg at approximately 2200 KJ) now enters the expander 6400, (Scroll, Vane or other positive displacement device).

This expander increases the volume to approximately 3.6 times its original input, (1:3.6). As the volume expands and the temperature drops to approximately minus 70 F, work is accomplished at the expander shaft and is transferred to the Alternator 6500 as work approximately 1700 KJ.

This shaft 6450 is hermetically sealed from ambient air conditions by a magnetic seal device, well known in the sealing trade. (Ferrofluidics). The shaft rotation is connected to a highly efficient electric generator (Alternator) 6500 producing A/C or D/C electric current. This liquid leaves the expander as Q4 (volume 2 M3/KG and approximately 500 KJ) and is collected in a receiver 6900. This is a mixture of approximately 60% liquid and approximately 40% vapor (approximately 60M %).

This liquid is pumped by pump 6950 to the Absorber 6100 losing approximately 50 KJ. Temperature is approximately minus 60 C. The ammonia gas from the top of the receiver 6900 at approximately 40M %, at approximately 0.2 bar and minus approximately 61 C provides approximately 550 KJ to the absorber 6100 shell.

The supertropic effect, created by the mixture of water and ammonia in the absorber section 6100, creates a low pressure of approximately 0.2 bar, allows the temperature to drop from the expander 6400 to minus approximately −61 C at approximately 0.2 bar. This allows the expander to work in a temperature differential of approximately 361 C. This predicts a Carnot efficiency of approximately 0.626 (62.6%).

This is the key to the supertropic effect created here. A normal Rankine cycle in small equipment is between approximately 10% and approximately 25% efficiency depending on the temperature differences that can be accepted by the most modern materials (approximately 1100 F to approximately 212 F). Even combined cycle central power plants can only expect approximately 44% efficiency before line losses to the end user.

Referring to FIG. 21, from the receiver 6900 liquid ammonia is pumped by pump 6950, to the bottom of the absorber tank 6600. Some of the ammonia gas that accumulates at the top of the receiver 6900 is connected by tubing to the absorber 6600.

The liquid part of the expander discharge is fed into a heat exchanger in the absorber 6600, where it will absorb part of the absorption heat, (a maximum temperature difference of about approximately 110 C. The other part is taken by the solution being warmed up. The liquid has to be returned as vapor at desorber 6300 conditions, under pressure from the liquid pump 6650, the rest of the latent heat can be used to cool down the aqueous(water) solution from the desorber thus making it weak (low ammonia in the water ammonia solution) prior to injection into the desorber 6300.

The ammonia vapor from the expander 6400 and receiver 6900 is fed to the absorber and will react with the water injected there, adding approximately 870 KJ or a delta energy of approximately 620 KJ. Weak solution in water/ammonia spray enters the top of the absorber at approximately 10 C contributing approximately 50 KJ. (Q7). The remaining absorption heat, not taken out by the liquid cycle, will increase the temperature to saturation for water at the absorber. It will do that at any circumstance according to Dalton's law that says the pressure in a vessel containing more than one medium, corresponds with the lowest temperature of the according medium and all partial pressures are added.

Referring to FIG. 21, the absorption system is self adjusting and will generate either a lower or higher counter pressure on the expander 6400. The weakened solution at approximately +60 C and approximately 20% ammonia is pumped from the absorber 6100 to the desorber at M=1.2 liters (Q8). Liquid from the receiver 6900 is pumped by pump 6950 through the absorber 6600 into the regenerator (Q5) 6700/6800 where the liquid ammonia is heated by the water flow from the desorber 6300 at approximately 1.2 liters and approximately 500 KJ (Q6=Q7) through the Regenerator 6700/6800 at approximately 10 C with approximately 50 KJ (Q7) in the regenerator 6700/6800 and is mixed with the ammonia flow from the desorber 6300 (approximately 5 bar, approximately 100 C, approximately 680 KJ) (Q2) before entering the superheater 6200 combining Q2, Q5, and Q6. 1020+680=1700 KJ where approximately 500 KJ Q3 is added. Approximately 2200 KJ leaves the Superheater 6200 to enter the expander 6400.

The purpose of the desorber 6300 is to heat the liquid that is pumped to it by the pump 6650 to separate the water from the ammonia so that only ammonia vapor can enter the superheater section and be heated to approximately 300 C to complete the cycle. Combustion products not completely used in the superheater 6200 continues in a conduit to the desorber 6300 where this heat separates the water from the ammonia. This leaves the desorber 6300 as approximately 7% ammonia and approximately 1200 KJ (Q1). The desorber 6300 can be constructed as a shell and tube exchanger of a design well known to the industry. In addition ambient air can assist in the desorption action to further increase efficiency of the system in the total energy out divided by energy in as a fuel utilization efficiency.

As the flue finally exits the system 6350, additional heat exchangers can be added to extract heat for co-generation used primarily for domestic hot water generation in residential and commercial applications. This heat exchanger can be one that is well known in the industry and can be a plate fin as manufactured by Alfa Laval.

At supertropic expansion, under the conditions as shown in FIG. 21, the expander 6400 will discharge a liquid-vapor mixture at approximately −61 CE, or approximately 212 Kelvin . The mass ratio is approximately 60% for liquid and thus approximately 40% for vapor, both of course being saturated at a pressure of approximately 0.2 bar, or approximately 20 kPa absolute. Note, the expansion volume ratio of approximately 3.6 at a pressure ratio of approximately 25—not possible with isentropic expansion!

This low pressure is achieved in the absorber 6600 and is dependent on the speed of absorption. The faster the absorption occurs, the more mass of ammonia can be circulated per unit of time and the larger will the power output on the expander shaft be. A basic advantage of this process is that approximately 40% of the total mass has to be absorbed.

In absorption refrigerators, the absorbed heat is transferred to the environment, because the process usually occurs at above ambient temperature and there is no other sink below that temperature. Ninety to 100% energy conversion occurs in the ideal case. Thus the liquid part of the expander discharge is fed through a heat exchanger inside the absorber 6600, where it will absorb a part of the absorption heat, the max temp differential is around approximately 120 CE. The other part of the absorber heat is taken up by the solution being warmed up. As the liquid finally has to be returned as vapor at desorber conditions, the rest of its latent heat can be used to cool down aqueous solution from the desorber and thus making it weak, prior to injection in the desorber 6350. The liquid ammonia cycle is herewith closed.

The ammonia vapor from the expander-receiver 6900 is fed to the absorber 6600 and will react with the water injected there. The remaining absorption heat, not taken out by the liquid cycle, will increase the temperature to saturation for water at absorber pressure (approximately 60 CE for 0.2 bar). It will do that under any circumstance, because Dalton's Law says that the pressure in a vessel containing more than one medium, corresponds with the lowest temperature of the according medium. Hence, the absorption system is self-adjusting and will generate either a lower or higher counter pressure on the expander, which only effects the shaft power output, but not the functionality and efficiency of the system as a whole (see balance calculations below. The strong solution from the absorber is pumped back to the desorber. Herewith the vapor cycle is closed. The top feed line from receiver 6900 feeds gas to absorber 6600, while the bottom feed line from receiver 6900 to absorber 6600 feeds liquid to the absorber 6600.

FIG. 22 shows an energy balance diagram 8000 for the supertrope power system of the invention shown in the previous embodiments, and shows the energy balance for the process. The process is described below in reference to FIG. 22.

An energy balance exists between the energy inputted and the energy out.

Q1 heat energy entering the absorber A(8600) 1200 KJ

Q2 heat energy leaving the desorber D(8300) 680 KJ

Q3 heat added at the superheater 500 KJ

Work equal Q1+Q3=2200 KJ

Balance Conditions

```
Desorber in = Q1 + Q8                    1200 KJ + (–20 KJ)                          1180 KJ
Desorber out = Q2 + Q6 + Q7              680 KJ + 450 KJ + 50 KJ                     1180 KJ
Absorber in = Q4 + Q7                    500 KJ + 50 KJ                               550 KJ
Absorber Out = Q5 + Q8                   570 KJ + (–20) KJ                            550 KJ
Expander (8400) in = Q2 + Q6 + Q5 + Q3   680 KJ + 450 KJ + 570 KJ + 500 KJ           2200 KJ
Expander (8400) out = Q4                 500 KJ + Work Q1 + Q3 (1700 KJ)             2200 KJ
Expander (8400) in – expander out                                                    1700 KJ
Q2 + Q5 + Q5 + Q3 – Q4 = W = Q1 + Q3
```

Q1=Q2+Q6+Q5–Q4(3)

Desorber(8300) in–Desorber(8600) out=Q1+Q8–Q2–Q6–Q7 (4)=0 (3) & (4) combined eliminating Q1—Desorber in–Desorber out=Q5–Q4+Q8–Q7 (5)=0– (Absorber in–Absorber out)=Q5–Q4+Q8–Q7 (6)=0

Energy Balance from Q's and W on FIG. 21

Energy balance requires that Ain=Aout and thus Q4+Q7=Q5+Q8 which means Q8=–20 kJ. This value inserted in equations (5) and (6) makes them zero, as required for energy balance. Din=Dout and Q8=–20 kJ, gives Q1=Q2+Q6+Q7–(–20)=1200 kJ.

Figure 23:
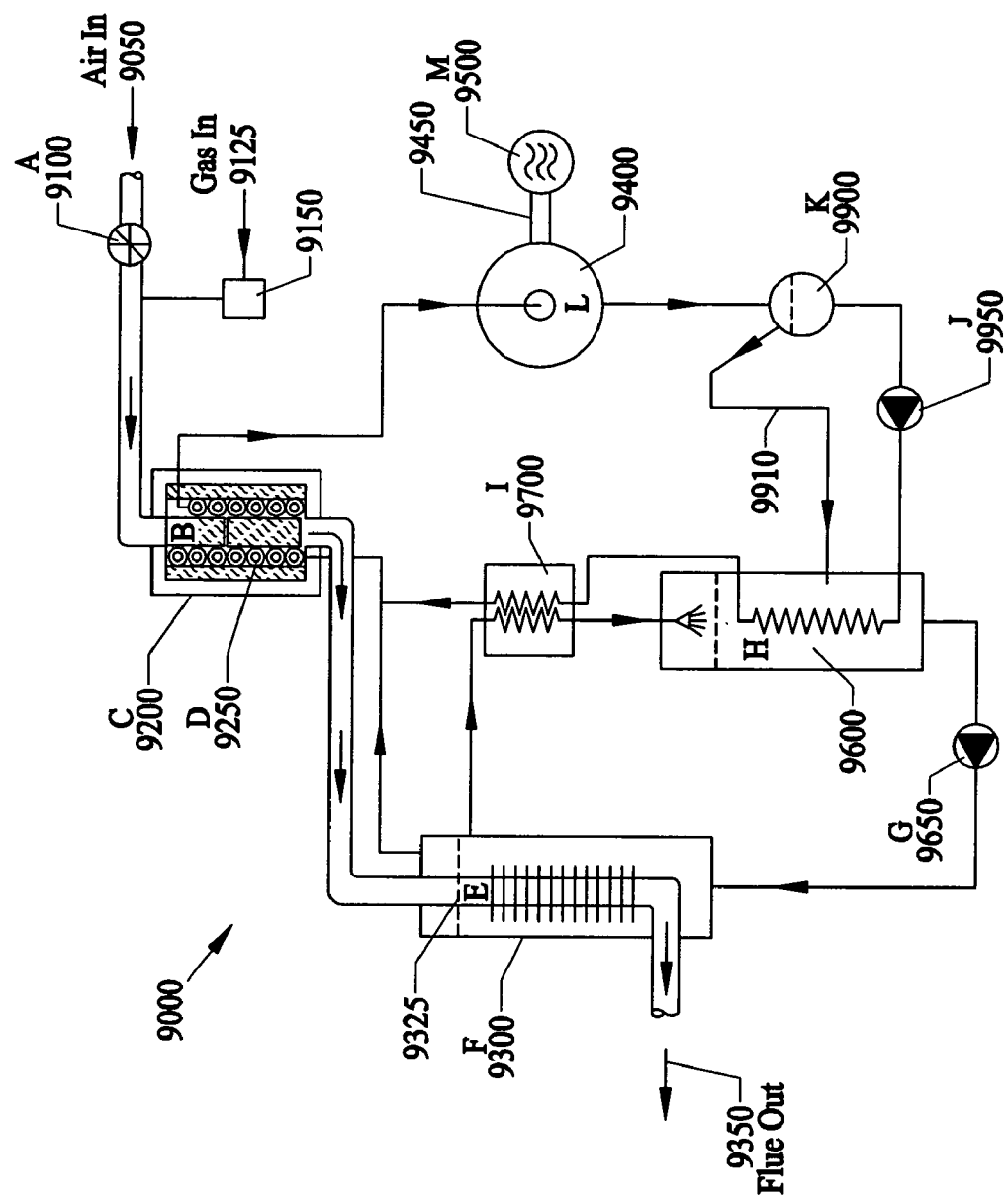

FIG. 23 shows another version of the supertropic power system 9000 of the preceding figures with a gas/air mixture heat source and superheater based on forced gas/air combustion. The components of FIG. 23 will now be described, and are similar to those previously described in reference to FIGS. 20 and 21.

Combustion blower 9100 can be one manufactured by Ametex and EBM.

Gaseous Fuel 9125 can be any gaseous fuel, natural gas, propane, and the like.

Burner 9150 can be one manufactured by Beckert or RSI.

Blower 9100 can be a fan, and the like.

Superheater 9200 can be a Alfa Laval, MDE superheater.

Desorber 9300 can be an Alfa Laval desorber.

Pumps 9650 and 9950 can be Cat pumps.

Absorber 9600 can be an Alfa Laval absorber.

Regenerator 9700 can be an Alfa Laval regenerator.

Receiver Tank 9900 can be a simple stainless steel tank

20 HP expander 9400 can be a scroll type expander.

15 KW alternator can be a Light Engineering motor.

The operation of the system in FIG. 23 is described as follows. Air 9050 enters combustion blower 9100, and can be mixed with a gaseous fuel 9125, such as natural gas, propane, and the like, to a combustion burner 9150. The combustion which can produce heated ammonia in the finned tubes 9250 of the superheater section 9200. The ammonia can be heated to approximately 700 F at approximately 75 psi.

This heated, pressurized ammonia liquid now enters the expander 9400, (such as but not limited to a Scroll, Vane or other positive displacement device). This expander 9400 increases the volume to approximately 3.6 times its original input. As the volume expands and the temperature drops to approximately minus 70 F, work is accomplished at the expander shaft 9450.

This shaft 9450 can be hermetically sealed from ambient air conditions by a magnetic seal device, such as but not limited to a Ferro Fluidics seal, and the like. The shaft 9450 rotation can be connected to a highly efficient electric generator 9500 such as an alternator that was previously described producing A/C or D/C electric current.

The liquid leaving the expander 9400 can be collected in a receiver 9900, which can be a mixture of approximately 60% liquid and approximately 40% vapor.

The supertropic effect, using the absorber section 9600, can create a low pressure of approximately 3 psi, allowing the temperature to drop from the expander 9400 to approximately minus 70 F. This allows the expander 9400 to work in a temperature differential of approximately 770 F, which predicts a Carnot efficiency of approximately 0.626 (62.6%). The Carnot efficiency can be the result of (700+460)minus (70+460) divided by (700+460)=0.626 or 62.6%

This is the key to the supertropic effect created here. A normal Rankine cycle in small equipment is between approximately 10% and approximately 25% depending on the temperature differences that can be accepted by the most modern materials (approximately 1100 F to approximately 212 F). Even combined cycle central power plants can only expect approximately 44% efficiency before line losses to the end user.

From the receiver 9900 liquid ammonia can be pumped by pump 9950, to the bottom of the absorber tank 9600. Some of the ammonia gas that accumulates at the top of the receiver 9900 can be connected by tubing 9910 to the absorber 9600.

The liquid part of the expander 9400 discharge is fed into a heat exchanger in the absorber 9600, where it will absorb part of the absorption heat, (a maximum temperature difference of about approximately 230 F). The other part is taken by the solution being warmed up. The liquid has to be returned as vapor at desorber 9300 conditions, under pressure from the liquid pump 9950, the rest of the latent heat can be used to cool down the aqueous(water) solution from the desorber 9300 thus making it weak (low ammonia in the water ammonia solution) prior to injection into the desorber 9300.

The ammonia vapor from the expander 9400 receiver 9900 is fed to the absorber 9600 and will react with the water injected there. The remaining absorption heat, not taken out by the liquid cycle, will increase the temperature to saturation for water at the absorber pressure (approximately 140 F and approximately 3 psi). It will do that at any circumstance according to Dalton's law that says the pressure in a vessel containing more than one medium, corresponds with the lowest temperature of the according medium. Daltons law is when the pressure of a gas mixture is the sum of all the partial gas pressures. The absorption system is self adjusting and will generate either a lower or higher counter pressure on the expander 9400. The strong solution is pumped from the absorber 9600 to the desorber 9300.

Referring again to FIG. 23, liquid from the absorber 9600 can be pumped by pump 9950 through the absorber 9600 into the regenerator 9700 where the liquid ammonia is heated by the water flow from the desorber 9300 in the reclaimer 9700 and is mixed with the ammonia flow from the desorber 9300 before entering the superheater 9200.

The purpose of the desorber 9300 is to heat the liquid that is pumped to it by the pump 9650 to separate the water from the ammonia so that only ammonia as a strong solution can enter the superheater section 9200 and be heated to approximately 700 F to complete the cycle. Combustion products not completely used in the superheater 9200 continues in a conduit to the desorber 9300 where this heat separates the water from the ammonia. The desorber 9300 can be constructed as a shell and tube exchanger 9325 of a design well known to the industry. In addition, ambient air can assist in the desorption action to further increase efficiency of the system in the total energy out divided by energy in as a fuel utilization efficiency.

As the flue 9350 finally exits the system 9000, additional heat exchangers can be added to extract heat for co-generation used primarily for domestic hot water generation in residential and commercial applications such as those described previously in this invention. Such heat exchangers can include, but are not limited to combustion flue gasses to domestic hot water as a plate fin exchanger known to those familiar with the art.

The supertropic power pack can be used to supply electrical power to power grids. The invention embodiments can provide power to all commercial and residential applications, as well as supply power for running vehicles, such as but not limited to electric cars, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for generating mechanical energy at high efficiencies, comprising the steps of:
    using a thermal generator for heating an ammonia-refrigerant to produce a heated and pressurized vapor having a temperature within a range of approximately 575° F. to approximately 700° F., at a pressure of approximately 72 psi to approximately 120 psi;
    using a positive displacement expander, having a fixed expansion ratio, for receiving and expanding the heated and pressurized vapor, as received from the thermal generator, against a low pressure subatmospheric sink in order to produce a mechanical work energy;
    using said mechanical work energy to rotate a shaft coupled with an electrical generator to produce electrical power;
    using a receiver for receiving and separating a liquid part and a vapor part of a saturated vapor discharge which exits from the positive displacement expander;
    using an absorber to generate a low pressure sub-atmospheric sink, at
    using an absorber to generate a low pressure sub-atmospheric sink, at approximately 0.2 bar as used by the positive displacement expander for expansion of the heated and pressurized gas at an inlet to the expander, to the saturated vapor discharge at an exit from the expander having a temperature between approximately −90 F. and approximately −70° F., a liquid part of the saturated vapor discharge is approximately 60% and a vapor part of the saturated vapor discharge is approximately 40%;
    using a desorber for heating and separating the vapor part from liquid produced from the absorber, and providing a resultant vapor to the thermal generator for reuse;
    using a pump for moving absorbent liquid produced from the absorber to the desorber;
    using a regenerator consisting of a heat exchanger with cooling and vaporization components, which recovers heat energy contained in a liquid stream received from the desorber, to heat and vaporize the liquid part of the ammonia-refrigerant received from the receiver in order to provide a resultant vapor to the heat generator for reuse; and
    using a second pump to transfer the ammonia-refrigerant from the receiver to the regenerator, wherein the method generates mechanical energy at high efficiencies.

2. The method of claim 1, further comprising the step of: providing a scroll expander having a fixed expansion ratio as the positive displacement expander.

3. The method of claim 1, further comprising the step of: providing a rotary vane expander having a fixed expansion ratio as the positive displacement expander.

4. The method of claim 1, further comprising the step of: providing a Wankel-type engine having a fixed expansion ratio as the positive displacement expander.

5. A closed loop system for generating mechanical energy at high efficiencies using an ammonia-refrigerant as the working fluid, comprising:
    a thermal generator for heating an ammonia-refrigerant to produce a heated and pressurized vapor having a temperature within a range of approximately 575° F. to approximately 700° F., at a pressure of approximately 72 psi to approximately 120 psi;
    a positive displacement expander having a fixed expansion ratio, for receiving and expanding the heated and pressurized vapor against a low pressure sub-atmospheric sink in order to produce mechanical work energy;
    a shaft coupled with an electrical generator, wherein rotating the shaft by the mechanical work energy causes the electrical generator produce electrical power;
    a receiver for receiving and separating a liquid part and a vapor part of a saturated vapor discharge which exits from the positive displacement expander;
    an absorber to generate a low pressure sub-atmospheric sink, at approximately 0.2 bar as used by the positive displacement expander for expansion of the heated and pressurized gas at an inlet to the expander, to the saturated vapor discharge at an exit from the expander having a temperature between approximately −90 F and approximately −70° F., a liquid part of the saturated vapor discharge is approximately 60% and a vapor part of the saturated vapor discharge is approximately 40%;
    a desorber for heating and separating the vapor part from liquid produced from the absorber, and providing a resultant vapor to the thermal generator for reuse;
    a pump for moving absorbent liquid produced from the absorber to the desorber;
    a regenerator consisting of a heat exchanger with cooling and vaporization components, which recovers heat energy contained in a liquid stream received from the desorber, to heat and vaporize the liquid part of the ammonia-refrigerant received from the receiver in order to provide a resultant vapor to the heat generator for reuse; and a second pump to transfer the ammonia-refrigerant from the receiver to the regenerator.

6. The system of claim 5, wherein the positive displacement expander includes:
a scroll expander having a fixed expansion ratio.

7. The system of claim 5, wherein the positive displacement expander includes:
a rotary vane expander having a fixed expansion ratio.

8. The system of claim 5, wherein the positive displacement expander includes:
a Wankel-type engine having a fixed expansion ratio.

9. A method for generating mechanical energy at high efficiencies, comprising the steps of:
using a thermal generator for heating an ammonia-refrigerant to produce a heated and pressurized vapor having a temperature within a range of approximately 575° F. to approximately 700° F., at a pressure of approximately 72 psi to approximately 120 psi;
using a positive displacement expander, having a fixed expansion ratio, for receiving and expanding the heated and pressurized vapor, as received from the thermal generator, against a low pressure subatmospheric sink in order to produce a mechanical work energy;
using said mechanical work energy to rotate a shaft coupled with an electrical generator to produce electrical power;
using a receiver for receiving and separating a liquid part and a vapor part of a saturated vapor discharge which exits from the positive displacement expander;
using an absorber to generate a low pressure sub-atmospheric sink, at approximately 0.2 bar as used by the positive displacement expander for expansion of the heated and pressurized gas at an inlet to the expander, to the saturated vapor discharge at an exit from the expander having a temperature between approximately −90 F and approximately −70° F., a liquid part of the saturated vapor discharge is approximately 60% and a vapor part of the saturated vapor discharge is approximately 40%;
using a heat exchanger, which is positioned within the absorber for cooling an absorption process in the absorber and recovering a heat produced as a result of the absorption process for heating the liquid part received from the receiver prior to delivery to a regenerator for reuse;
using a desorber for heating and separating the vapor part from liquid produced from the absorber, and providing a resultant vapor to the thermal generator for reuse;
using a pump for moving absorbent liquid produced from the absorber to the desorber;
using the regenerator consisting of another heat exchanger with cooling and vaporization components, which recovers heat energy contained in a liquid stream received from the desorber, to heat and vaporize the liquid part of the ammonia-refrigerant received from the receiver in order to provide a resultant vapor to the heat generator for reuse; and
using a second pump to transfer the ammonia-refrigerant from the receiver to the regenerator via the heat exchanger installed within the absorber, wherein the method generates mechanical energy at high efficiencies.

10. The method of claim 9, further comprising the step of:
providing a scroll expander having a fixed expansion ratio as the positive displacement expander.

11. The method of claim 9, further comprising the step of:
providing a rotary vane expander having a fixed expansion ratio as the positive displacement expander.

12. The method of claim 9, further comprising the step of:
providing a Wankel-type engine having a fixed expansion ratio as the positive displacement expander.

13. A closed loop system for generating mechanical energy at high efficiencies using an ammonia-refrigerant as the working fluid, comprising:
a thermal generator for heating an ammonia-refrigerant to produce a heated and pressurized vapor having a temperature within a range of approximately 575° F. to approximately 700° F., at a pressure of approximately 72 psi to approximately 120 psi;
a positive displacement expander having a fixed expansion ratio, for receiving and expanding the heated and pressurized vapor against a low pressure sub-atmospheric sink in order to produce mechanical work energy;
a shaft coupled with an electrical generator, wherein rotating the shaft by the mechanical work energy causes the electrical generator produce electrical power;
a receiver for receiving and separating a liquid part and a vapor part of a saturated vapor discharge which exits from the positive displacement expander;
an absorber to generate a low pressure sub-atmospheric sink, at approximately 0.2 bar as used by the positive displacement expander for expansion of the heated and pressurized gas at an inlet to the expander, to the saturated vapor discharge at an exit from the expander having a temperature between approximately −90 F and approximately −70° F., a liquid part of the saturated vapor discharge is approximately 60% and a vapor part of the saturated vapor discharge is approximately 40%;
a heat exchanger, which is positioned within the absorber for cooling an absorption process in the absorber and recovering a heat produced as a result of the absorption process for heating the liquid part received from the receiver prior to delivery to a regenerator for reuse;
a desorber for heating and separating the vapor part from liquid produced from the absorber, and providing a resultant vapor to the thermal generator for reuse;
a pump for moving absorbent liquid produced from the absorber to the desorber;
the regenerator consisting of another heat exchanger with cooling and vaporization components, which recovers heat energy contained in a liquid stream received from the desorber, to heat and vaporize the liquid part of the ammonia-refrigerant received from the receiver in order to provide a resultant vapor to the heat generator for reuse; and
a second pump to transfer the ammonia-refrigerant from the receiver to the regenerator via a heat exchanger installed within the absorber.

14. The system of claim 13, wherein the positive displacement expander includes:
a scroll expander having a fixed expansion ratio.

15. The system of claim 13, wherein the positive displacement expander includes:
a rotary vane expander having a fixed expansion ratio.

16. The system of claim 13, wherein the positive displacement to expander includes:
a Wankel-type engine having a fixed expansion ratio.

* * * * *